United States Patent
Blot-Lefevre

(10) Patent No.: US 8,813,208 B2
(45) Date of Patent: Aug. 19, 2014

(54) SYSTEM AND METHOD FOR THE MANAGEMENT OF SECURE ELECTRONIC CORRESPONDENCE SESSIONS

(75) Inventor: Eric Blot-Lefevre, Neuilly-sur-Seine (FR)

(73) Assignee: Trustseed S.A.S., Gelluis (FR)

( * ) Notice: Subject to any disclaimer, the term of this patent is extended or adjusted under 35 U.S.C. 154(b) by 0 days.

(21) Appl. No.: 13/499,095

(22) PCT Filed: Sep. 21, 2010

(86) PCT No.: PCT/EP2010/063874
§ 371 (c)(1),
(2), (4) Date: Mar. 29, 2012

(87) PCT Pub. No.: WO2011/039076
PCT Pub. Date: Apr. 7, 2011

(65) Prior Publication Data
US 2012/0192261 A1    Jul. 26, 2012

(30) Foreign Application Priority Data
Sep. 30, 2009   (FR) ...................... 09 56819

(51) Int. Cl.
| | | |
|---|---|---|
| *G06F 7/04* | (2006.01) | |
| *H04L 29/06* | (2006.01) | |
| *G06F 15/16* | (2006.01) | |
| *H04L 29/08* | (2006.01) | |
| *G06Q 20/02* | (2012.01) | |
| *G06Q 20/32* | (2012.01) | |
| *H04L 9/32* | (2006.01) | |
| *G06Q 50/18* | (2012.01) | |

(52) U.S. Cl.
CPC ........ *H04L 63/0823* (2013.01); *H04L 65/1006* (2013.01); *H04L 65/1069* (2013.01); *H04L 67/141* (2013.01); *G06Q 20/02* (2013.01); *G06Q 20/32* (2013.01); *G06Q 20/322* (2013.01); *G06Q 20/325* (2013.01); *G06Q 50/18* (2013.01); *H04L 63/0838* (2013.01); *H04L 63/126* (2013.01); *H04L 63/18* (2013.01); *H04L 2209/56* (2013.01); *H04L 9/3247* (2013.01); *H04L 2209/60* (2013.01); *H04L 2209/80* (2013.01)
USPC ............................. 726/10; 709/227; 713/165

(58) Field of Classification Search
None
See application file for complete search history.

(56) References Cited

U.S. PATENT DOCUMENTS

| 6,199,052 B1 * | 3/2001 | Mitty et al. ...................... 705/75 |
| 2001/0052007 A1 * | 12/2001 | Shigezumi .................... 709/223 |

(Continued)

FOREIGN PATENT DOCUMENTS

| EP | 2146312 A1 | 1/2010 |
| FR | 2900010 A1 | 10/2007 |
| WO | 2008/132248 A1 | 11/2008 |

OTHER PUBLICATIONS cecurity.com: "Solutions d'e-Archivage Legal," Feb. 28, 2005.

*Primary Examiner* — Fatoumata Traore
(74) *Attorney, Agent, or Firm* — Baker & Hostetler LLP

(57) ABSTRACT

A system and method for the management of secure electronic correspondences. The system includes at least one directory, at least one domicile server, at least one processing operator and at least one certification operator. The correspondence sessions are opened by a strong authentication procedure comprising the routing of a secret code over a channel different from the session channel and an identifier specific to the current session. In addition, in order to allow the delivery of correspondence to be sent, it is necessary for the validity of the trust attributes of the sender, the recipients and those involved in the document processing chain be certified by the certification operator for the level required for delivery. The compliance of the processing operations with the operator's specifications is checked by sending, acknowledging and returning certification tokens specific to each of the processing steps.

28 Claims, 15 Drawing Sheets

(56) References Cited

U.S. PATENT DOCUMENTS

| | | | |
|---|---|---|---|
| 2003/0028495 A1* | 2/2003 | Pallante | 705/78 |
| 2003/0036999 A1* | 2/2003 | Mirlas et al. | 705/40 |
| 2007/0118484 A1* | 5/2007 | Borenstein et al. | 705/75 |
| 2007/0133803 A1* | 6/2007 | Saito et al. | 380/267 |
| 2008/0192925 A1* | 8/2008 | Sachs et al. | 380/29 |

* cited by examiner

| TOKENS | SERVICES | OPERATIONS | SERVICE PROVIDERS | TOKEN RETURN |
|---|---|---|---|---|
| Token 1 S1 | Sequencing | THE FDS and J2 CPO DOC OPEM | COM1 | COM1 |
| Token 2 S1 | SPE DOC composition | Document originals and versions | OPEM1 | COM1 |
| Token 3 S2 | SPE DOC transmittal report | Choice of sent documents | COM1 | COM1 |
| Token 4 S2 | Execution of DOC ampliation | Ampliation of originals, duplicates, versions | OPEM1 | COM1 |
| Token 5 S2 | Sender original archiving | Deposit doc box original document | OPEN1 | COM1 |
| Token 6 S2 | Receiver original archiving | Deposit doc box original document | OPEN2 | COM1 |
| Token 7 S2 | Sending duplicate switching | Movement of correspondence doc. | OPEM1 | COM1 |
| Token 8 S2 | Duplicate switching | Movement of correspondence doc. | OPEM2 | COM1 |
| Token 9 S2 | Post printing | Webtop publishing vicinity recipient | OPEN2 | COM1 |
| Token 10 S2 | Multi-channel communication | Secure fax or email | OPEN2 | COM1 |
| Token 11 S2 | ERP data transfer | Structured management file | OPEM1 | COM1 |
| Token 12 S2 | AR management coupon | AR specimen cf. Correspondence No. | OPEM2 | COM1 |
| Token 13 S3 | Report of accepted ARs | Choice of documents sent | COM2 | COM2 |
| Token 14 S3 | Execution of AR ampliation | Ampliation of originals, duplicates, versions | OPEM2 | COM2 |
| Token 15 S3 | Recip. AR original archiving | Deposit AR original box | OPEN2 | COM2 |
| Token 16 S3 | Send. AR original archiving | Deposit AR original box | OPEN1 | COM2 |
| Token 17 S3 | Recip. AR duplicate switching | Movement of AR correspondence | OPEN2 | COM2 |
| Token 18 S3 | Send. AR duplicate switching | Movement of AR correspondence | OPEN1 | COM2 |

FIG.3

RID TABLE:

RID/TIT/PSD/PSC-COR/OPET/CCU/NOT

| IDP | Naming | AEML | TMOB | H1 Handover envelope | H2 Sending | H3 Receipt | H4 Consultation | H5 Archive handover | H6 Archive signature |
|---|---|---|---|---|---|---|---|---|---|
| Login 1 | name | | | | X | | | | |
| Login 2 | name | xy@mail.com | 00000000 | X | | | X | | |
| Login 3 | name | | | | X | | | | |
| Login 4 | name | | | X | X | X | | | |

FIG.8a

| REM no. | Seq. no. | Year | Month | Day | Hour | Minute | Second | Tenth |
|---|---|---|---|---|---|---|---|---|
| 18 digits | 0000 | 0000 | 00 | 00 | 00 | 00 | 00 | 00 |

FIG.8b

| RIDE | PSD | PSC-COR | ADR | SERVICE PROVIDERS | CPO | ARC | CMT | EDI | FGS | CxC |
|---|---|---|---|---|---|---|---|---|---|---|
| TIT no. IDE | DOM no. MDT PROXY REF. CPR REQ. LR/AC OCSP | NATIO no. MDT PROXY REF. CPB REQ. LR/AC OCSP | AEML APOST TMOB | AFFILIATION no. PROXY MANDATES PUBLIC KEY REQUEST On the LR/AC server ADMIN SERVER IP | - | - | - | - | - | - |
| © | OK | OK | OK | | | OK | OK | OK | OK | OK |

FIG.8c

| RID | TIT No. | | REM No. = 66666666666666 |
|---|---|---|---|
| TITU | Naming | ← | ENRLT No. = -------- |
| IDE | CSS/TMOB | ← | ENRLT LOG LINE No. |
| PSD | DOM No. | ← | SMS ACK REF. |
| PSC-COR | NATIO No. | ← | DOM/FI.SIG ACK REF. |
| OPET | AFFI No. | ← | HD TAB.ENRLT RIDE |

FIG.8d

| SEQUENCE FILE | FILE REF. | FR FILE WEIGHT | © FR INTEGRITY | SEQUENCE HD |
|---|---|---|---|---|
| FD descriptor file | RIDE/RIDD (N) → PSD/PSD PSC-COR/PSC-COR OPET/OPET | R1 to R4 | Number of pairs | File root Handover: ...... |
| FC content file | List/file ref. Content per pair | Unit weight | Number from 1 to N | Correspondence nos from 1 to N |

FIG.10a

| RIDE | RIDD | PSD E | PSD D | PSC-CORE | PSC-COR D | OPET E | OPET D | ADR E | ADR D | CORR no. |
|---|---|---|---|---|---|---|---|---|---|---|
| R1/R4 | RIDD1 | N° | PSD1 N° | N° | PSC-COR1 N° | AF no. | OPETD1 AF no. | AML N1/2 APT TM0B N1/2 | AML1 /N3 APT1 ------ TM0B1 /N3 | ------ |
| R1/R4 | RIDD2 | | PSD2 N° | | PSC-COR2 N° | | OPETD2 AF no. | | AML2 /N3 APT2 ------ TM0B2 /N3 | |
| R1/R4 | RIDD3 | | PSD3 N° | | PSC-COR3 N° | | OPETD3 AF no. | | AML3 /N3 APT3 ------ TM0B3 /N3 | ------ |
| Etc.... | | | | | | | | | | |

FIG.10b

| Pairs | TIT No. | PSD No. | PSC-COR D No. | OPETD No. | R1toR4 | AEML | APT | TMOB | REM No. | RAC No. | CORR No. | © No. Completeness |
|---|---|---|---|---|---|---|---|---|---|---|---|---|
| RIDE |  |  |  |  |  |  |  |  |  |  |  |  |
| RIDD1 |  |  |  |  |  |  |  |  |  |  |  | --- |
| RIDD2 |  |  |  |  |  |  |  |  |  |  |  | --- |
| RIDD3 |  |  |  |  |  |  |  |  |  |  |  | --- |
| RIDD4 |  |  |  |  |  |  |  |  |  |  |  | --- |
| RIDD5 |  |  |  |  |  |  |  |  |  |  |  |  |
| RIDD6 |  |  |  |  |  |  |  |  |  |  |  |  |

FIG. 10c

| RIDE | PSD | PSC-COR D | ADR | PROOFS | CPO | ARC | CMT | EDI | FGS | CxC |
|---|---|---|---|---|---|---|---|---|---|---|
| TIT No. IDE | PSD No. MDT PROXY REF.CPB REQ.LR/AC OCSP | NATIO No. MDT PROXY REF.CPB REQ.LR/AC OCSP | AEML APOST TMOB | AFFILIATION No. PROXY MANDATES PUBLIC KEY REQUEST LR/AC IP SERVER ADMIN | --- | --- | --- | --- | --- | --- |
|  |  |  |  |  | --- | --- | --- | --- | --- | --- |
|  |  |  |  |  | --- | --- | --- | --- | --- | --- |
|  |  |  |  |  |  | --- | --- | --- | --- | --- |
| © | OK | OK | OK | OK |  | OK | OK | OK | OK | OK |

FIG. 10d

| Pairs | PSD | PSC-CORD | ADR | TYPCO NOTA Network | PROOFS | CPO | ARC | CMT | EDI | FGS | CxC |
|---|---|---|---|---|---|---|---|---|---|---|---|
| RIDE | PSD No. MDT PROXY REF.CPB REQ.LR/AC OCSP | NATIO No. MDT PROXY REF.CPB REQ.LR/AC OCSP | AEML APOST TMOB | NOTA3 R3 | AFFILIATION No. PROXY MANDATES PUBLIC KEY REQUEST LR/AC IP SERVER ADMIN | --- | --- | --- | --- | --- | --- |
| RIDD1 | PSD No. MDT PROXY REF.CPB REQ.LR/AC OCSP | NATIO No. MDT PROXY REF.CPB REQ.LR/AC OCSP | AEML APOST TMOB | NOTA2 R3 | AFFILIATION No. PROXY MANDATES PUBLIC KEY REQUEST LR/AC IP SERVER ADMIN | --- | --- | --- | --- | --- | --- |
| © | OK | OK | OK | N5/R3 | | OK | OK | OK | OK | OK | OK |
| RIDE RIDD2 | | | | | | | | | | | |
| © RIDE RIDD3 | | | | | | | | | | | |

FIG.10e

| 1 | RIDE | PSD1 | OPET1 | PSC-CORD1 | R3 |
|---|---|---|---|---|---|
| N | RIDD | PSD2 | OPET2 | PSC-CORD2 | R3 |
| OPET1 | JTS 1, 2, 3, 4, 5, 11, 16, 18 | | | | |
| OPET2 | JTS 12, 13, 14, 6, 8, 9, 10, 15, 17 | | | | |

FIG.10f

| | Correspondence no. | Rest no. | Session no. S1 | Handover no. |
|---|---|---|---|---|

FIG.10h

| TYPCO | DOC SPE | DOC EXE | DOC ARC | DUP CMT | FTP EDI | FML CxC | FGS TRF | AR SPE | AR EXE | AR ARC | AR CMT |
|---|---|---|---|---|---|---|---|---|---|---|---|
| LRE | OPEN1 | OPEN1 | OPEN1/2 | OPEN12 | OPEN12 | OPEN2 | OPEN1 | OPEN2 | OPEN2 | OPEN21 | OPEN21 |
| Actives | x | x | x | x | ... | ... | ... | x | x | x | x |

FIG.10g

| SESSIONS | PSD1-PSD2 Domiciliation | PSC-COR1 - PSC-COR2 Certification and interoperability | OPEM1-OPEM2 OPERATORS Shared Service Centre SCC | OPEN1-OPEN2 NATIONAL OPERATORS |
|---|---|---|---|---|
| S2 | S' + OPTION S2<br>9.<br>PSD1 – BPG1 RIDE :<br>PVE:SIG: μ of the chosen SPE<br><br>PSD1 – BPG – MVP1:<br>Store JTS PF to COL1/BPG1<br>= μJTS (9 JTS)CORR no.<br>/SPE/DOC + token 3 (PVE)<br><br>SW/O μ JTS 9/CORR no./SPE-<br>DOC to OPEM1 →  | | 10.<br>OPEM1<br><br>OPEM1: (CORR no./SPE-DOC/3 tokens)<br>EXEC/AMPLIATION/APPLICATIONS:<br><br>A1.+ J5  ORI ARC SWO OPEN1 Ack → 11<br>A2.+ J6  ORI ARC SWO OPEN2 Ack → 12<br><br>A3.+ J7  DUPCMT PF OPEM1 Ack → 13<br>A4.+ J8  DUPCMT PF OPEM2 Ack → 14<br><br>A5.+ J9  FPT EDI SWO OPEN2 Ack → 15<br><br>A6.+ J10 FMLC xC SWO OPEN2 Ack → 16<br>→ 17<br>A7.+ J11 FGSTRF SWO OPEM1 Ack<br><br>A8.+ J12 FARCPA SWO OPEM2 Ack → 18 | |
| S2 | | JNA = μAPPLI/ACKS<br>RTR J4 / MVPD1 – BPG1 | OPE: OPEN1 / OPEN2: APPLIC<br>OPE: OPEM1 / OPEM2: APPLIC<br><br>11. ARC E. DEP. no. JNA RTR J5<br>12. ARC D. DEP. no. JNA RTR J6<br><br>13. CMT. E. MVT. no. JNA. RTR J7<br>14. CMT. D. MVT. no. JNA. RTR J8<br><br>15. EDI. D. RTE. no. JNA. RTR J9<br><br>16. CxC. D. MES. no. JNA. RTR J10<br><br>17. TRF. D. TRM. no. JNA. RTR J11<br><br>18. CPO A.R. D.SPE no. AR.<br>   AMPLI/ORI AR/DUP AR<br>   SWO SPE AR/DOM2 – BPG2<br>   ACK.DOM2<br>   JNA CPA-SPE AR<br>   /RTR J12 (SPE AR) | |
| | 19.<br>PSD2 – BPG2<br>NOTIFI.DEST/COORD/HAB | ← | | |

FIG.11

| SESSIONS | PSD1-PSD2 Domiciliation | PSC-COR1 - PSC-COR2 Certification and interoperability | OPEM1-OPEM2 OPERATORS Shared Service Centre SCC | OPEN1-OPEN2 NATIONAL OPERATORS |
|---|---|---|---|---|
| S3 | 20.   So: Option choice S3<br><br>PSD2 – BPG2:<br>PVR.SIG: send choice<br>JSPE AR RIDD/ RIDE<br><br>PSD2-MVPD 2: recall (6a)<br><br>Store sends PF to<br>DCOM2-BPG2-COL2<br>5 TOKENS/CORR No./SPE AR<br>+ token J13 (PVR)<br>SWO 5 JTS/CORRno./SPE AR<br>ACK<br>JNA: PVR /ACK ORD AR<br>RTR J 13(PVR) / MVPD2-<br>BPG2 | | OPEM2<br>5JTS SPE-AR<br>EXE/ AMPLIATION/APPLI.<br><br>A 1+J15-ORI-AR ARC-SWO-OPEN2/ Ack  21<br>A 2+J16-ORI-AR ARC-SWO-OPEN1/ Ack  22<br>A 3+J17-DUP-AR CMT-PF- OPEM2/ Ack  23<br>A 4+J18-DUP-AR CMT-PF- OPEM1/ Ack  24<br><br>JNA EXEC APPLI RTR TOKEN 14 | |
| S3 | | | OPEN2-OPEN1-OPEM2-OPEM1<br>21. OPEN2: ARC.D/DEP no./JNA/RTR J15<br>22. OPEN1: ARC.E/DEP no./JNA/RTR J16<br><br>23. OPEM2: CMT.D.MVT no./JNA/RTR J17<br>24. OPEM1: CMT.E.MVT no./JNA/RTR J18<br><br>RTR of tokens  DOM2 - BPG2 - MVPD2 | |

FIG.12

SYSTEM AND METHOD FOR THE MANAGEMENT OF SECURE ELECTRONIC CORRESPONDENCE SESSIONS

CROSS-REFERENCE TO RELATED APPLICATIONS

This application is a National Stage of International patent application PCT/EP2010/063874, filed on Sep. 21, 2010, which claims priority to foreign French patent application No. FR 09 56819, filed on Sep. 30, 2009, the disclosures of each of which are incorporated by reference in their entireties.

FIELD OF THE DISCLOSED SUBJECT MATTER

The present invention belongs to the field of systems for secure electronic correspondence. More precisely, it applies to the verification of the attributes that make it possible to guarantee the probative value of such correspondence.

BACKGROUND

The European legal systems now recognize that an electronic document of which the author can be identified with certainty and which is conserved in conditions that make it possible to ensure the integrity thereof has the same probative value as writing on a paper medium (Article 1316 and following of the French Civil Code, for example). However, the most widespread production systems, such as a word processor generating a document in PDF (Portable Digital File) format and an interchange system (electronic messaging on the Internet) for interchanging electronic documents, do not currently make it possible to guarantee either the identity of their author or their integrity. The problem relates both to private correspondence between individuals or between an individual and an enterprise or an institution and correspondence between enterprises and authorities or between an enterprise or an authority and its clients or its users. In the latter case, the flow of documents may be particularly large (several tens of millions of invoices per month are sent to the clients of EDF, of GDF Suez, of Orange). The manufacture and transmittal of these documents are therefore automated in production systems which necessarily involve many operators. If it is desired to guarantee that the document sent and archived is identical to that originally produced, it is therefore necessary to ensure end-to-end traceability of all these operations and a verification that the operators have carried out the operations that they had to execute. This applies to a system for production of paper documents or of electronic documents. Moreover, with electronic transmittal, for the documents thus sent to be considered to be validly addressed, it is necessary both that these documents bear the identification of the sender and that the latter is assured of the identity of the intended recipients.

Partial solutions have been provided for the problem of the probative value of electronic documents interchanged electronically. In particular, if the sender has an electronic signature certificate delivered under prescribed conditions and of which the validity is verified by a certification authority, his identity as the author of an electronic document on which he has placed the said certificate will be recognized as validly demonstrated. But electronic signature certificates are still not very widely used notably because of their high cost and of their awkwardness of use. Moreover, this does not solve the problem posed by a document production system involving multiple operators. The applicant has already filed patent applications in France with the objective notably of supplying a score of the identity of a sender and of recipients of electronic documents that makes it possible to assess the probative value of the documents interchanged between these parties. See for example the applications filed under numbers FR/06 04 107 and FR/08 02 239.

SUMMARY

The present invention greatly improves the responses provided by these documents of the prior art to the problem raised above by providing notably the verification, at the opening of a secure session of electronic correspondence, of the trust attributes of the sender, of the intended recipients and of all those involved in the secure electronic correspondence system.

Accordingly, the present invention discloses a system for the management of sessions of secure electronic correspondence between at least one sending user and at least one receiving user, the said system comprising at least one directory server, at least one electronic correspondence domiciliation server comprising a private management office for each user, notably for choosing at least one correspondence counterpart, at least one server for the processing of the said correspondence, and at least one electronic correspondence certification server, the said system being characterized in that the said at least one domiciliation server also comprises at least one electronic correspondence sessions management module comprising at least one authorization submodule for the opening of a session between a user and his private management office on condition of verification by request, before the said opening, to at least one certification server for certifying the validity of documentary identity attributes of the said user, of his counterpart and of the electronic correspondence processing servers.

Advantageously, said session-opening submodule is capable of executing a strong authentication function of a user of said system by verifying the identity of a code supplied by said user to said domiciliation server with a unique secret transmitted in two different forms by the certification server, on the one hand to the domiciliation server and on the other hand to said user, this second transmission taking place over a different communication channel than that by which the user connects to the management system, the output of said strong authentication function being a condition of a continuation of the opening of the session.

Advantageously, said authentication function transmits said secret to the domiciliation server in the form of an item of information computed from said secret generated by the certification server and of at least one data item characteristic of the session being opened, said data item being created by the domiciliation server and transmitted to the certification server.

Advantageously, said information is an enrolment number attached to said session and computed by producing the product of said secret and of a sequence number of the session being opened.

Advantageously, the sending user can invite at least one receiving user to register on a domiciliation server proposed in a list comprising at least one element.

Advantageously, the system of the invention also comprises an invited-users registration module, said module offering said invited user the option of supplying at least information relating to his identification and physical and electronic address attributes comprising at least one mobile telephone number.

Advantageously, said registration module also offers the user the option of adhering to a universal correspondence convention proposed by the chosen domiciliation server and to a bilateral correspondence convention proposed by the inviting user.

Advantageously, said registration module also proposes to the registering user the supply of material proofs of at least one portion of the identification and address information that he has supplied to said module and accepts his registration only after reception and checking of the conformity of said proofs to the information supplied to said module.

Advantageously, the certification server comprises a database of non-repudiated electronic signatures of the users, of the domiciliation operators, of the processing operators and of the certification operators, said database being updated with the service providers sending said signatures at a frequency computed as a function of a statistic of repudiation of said signatures and of a statistic of electronic correspondence flow.

Advantageously, said sessions management module also comprises a submodule for managing handovers of correspondence to be sent to the private management office of a user.

Advantageously, said submodule for managing handovers is capable of refusing a handover of correspondence if a scoring criterion of the sender/receiver pair of said correspondence is below a scoring threshold prescribed by the certification operator.

Advantageously, said submodule for managing handovers comprises a function of creating a consolidated correspondence sequence table containing, for each recipient, their validated address data, the references of the validated files to be sent, the sequence numbers of each line of correspondence.

Advantageously, said submodule for managing handovers comprises, at the output of said function for creating a consolidated correspondence sequence table, a function for outputting a date-stamped log of validation of said creation.

Advantageously, said submodule for managing handovers comprises, at the output of said function for creating a consolidated correspondence sequence table, a function for sending a message to the certification server, said message comprising said consolidated correspondence sequence table, then a function for receiving a message from said certification server, said message comprising a consolidated correspondence sequence table corrected and validated by said certification server.

Advantageously, said submodule for managing handovers comprises a function for managing tokens for certifying the execution of processing operations to be carried out on each item of electronic correspondence.

Advantageously, said function for managing certification tokens is capable of receiving said tokens from the certification server, in a matrix of documentary probative value, at the domiciliation server, said matrix comprising all the tokens necessary for the certification of the items of correspondence sent or received during the current session by the certification operator.

Advantageously, said function for managing certification tokens is capable of routing the received tokens to the processing operators.

Advantageously, said function for managing certification tokens is capable of receiving from the certification server a message comprising the certification tokens of the processing operations that have been carried out in conformity with the specifications of the certification operator.

Advantageously, said sessions management module also comprises a submodule for validation, by the user or an agent designated by him, of the sending of the electronic correspondence to his recipients.

Advantageously, said validation submodule comprises a function for outputting a validation log indicating the completeness of the checks carried out before validation.

Advantageously, said validation submodule comprises a function for outputting a table of validation of the trust attributes of each receiving user.

Advantageously, said validation submodule comprises a function for sealing said electronic correspondence.

Advantageously, said sessions management module also comprises a submodule for managing acknowledgements of receipt of the electronic correspondence.

Advantageously, said sessions management module also comprises a submodule for managing communications between users of said system, said module being capable of making a choice of secure routing path based on information relating to the domiciliation server and to the certification server of which the sending users, the receiving users, the operators for processing said electronic correspondence and the certification operators are subscribers.

Advantageously, said submodule for managing communications between users of said system is capable of producing a choice between a first type of routing paths when a sender and a receiver use a single domiciliation operator, a single processing operator and a single certification operator, a second type of routing paths when a sender and a receiver use at least two domiciliation servers, a single processing operator and a single certification operator, a third type of routing paths when a sender and a receiver use at least two different domiciliation servers, at least two processing operators and a single certification operator, and a fourth type of routing paths for different certification servers when a sender and a receiver use at least two different domiciliation servers, at least two processing operators and at least two certification operators.

The present invention also discloses a method for managing sessions of secure electronic correspondence between at least one sending user and at least one receiving user, said method comprising a step of connection to at least one directory server, at least one step of connection to an electronic correspondence domiciliation server, said server comprising a private management office for each user, notably for choosing at least one correspondence counterpart, at least one step of processing said items of correspondence and at least one step of connection of the domiciliation server to the electronic correspondence certification server, the said system being characterized in that the said step of connection to the domiciliation server further comprises at least one step of managing electronic correspondence sessions comprising at least one sub-step of authorizing the opening of a session between a user and his private management office on condition of verification by request, before the said opening, to at least one certification server for certifying the validity of documentary identity attributes of said user, of his counterpart and of the operators of the steps of processing the electronic correspondence.

Advantageously, said step of managing sessions of electronic correspondence also comprises a sub-step of managing handovers of correspondence to be sent to the private management office of a user.

Advantageously, said step of managing sessions of electronic correspondence also comprises a sub-step of validation, by the user or an agent designated by him, of the sending of the electronic correspondence to his recipients.

Advantageously, said step of managing sessions of electronic correspondence also comprises a sub-step of managing communications between users of said system, said sub-step being capable of making a choice of secure routing path based on information relating to the domiciliation server and to the certification server of which the sending users, the receiving users, the operators for processing the said electronic correspondence and the certification operators are subscribers.

The invention may be applied without obliging all the users wishing to interchange mail to use electronic signature certificates. It also makes it possible to safely process very high volumes of documents without adding verifications that take prohibitive time. On the contrary, the verifications are carried out virtually in real time. The invention may finally be applied in a very heterogeneous environment comprising senders and recipients belonging to professional, geographic and legal worlds that are very different and that use many operators in the document-processing system.

BRIEF DESCRIPTION OF THE DRAWINGS

The invention will be better understood and its various features and advantages will emerge from the following description of several exemplary embodiments and of its appended figures in which:

FIG. 3 defines the certification tokens used by the processing operations of a session in one embodiment of the invention;

FIGS. 8a to 8d represent tables which can be used for implementing a session of type $S_0$ in one embodiment of the invention;

FIGS. 10a to 10h represent tables which can be used for implementing a session of type $S_1$ in one embodiment of the invention;

FIG. 11 represents the data flows managed by a session of type $S_2$ in one embodiment of the invention;

FIG. 12 represents the data flows managed by a session of type $S_3$ in one embodiment of the invention.

DETAILED DESCRIPTION

Figure 1:
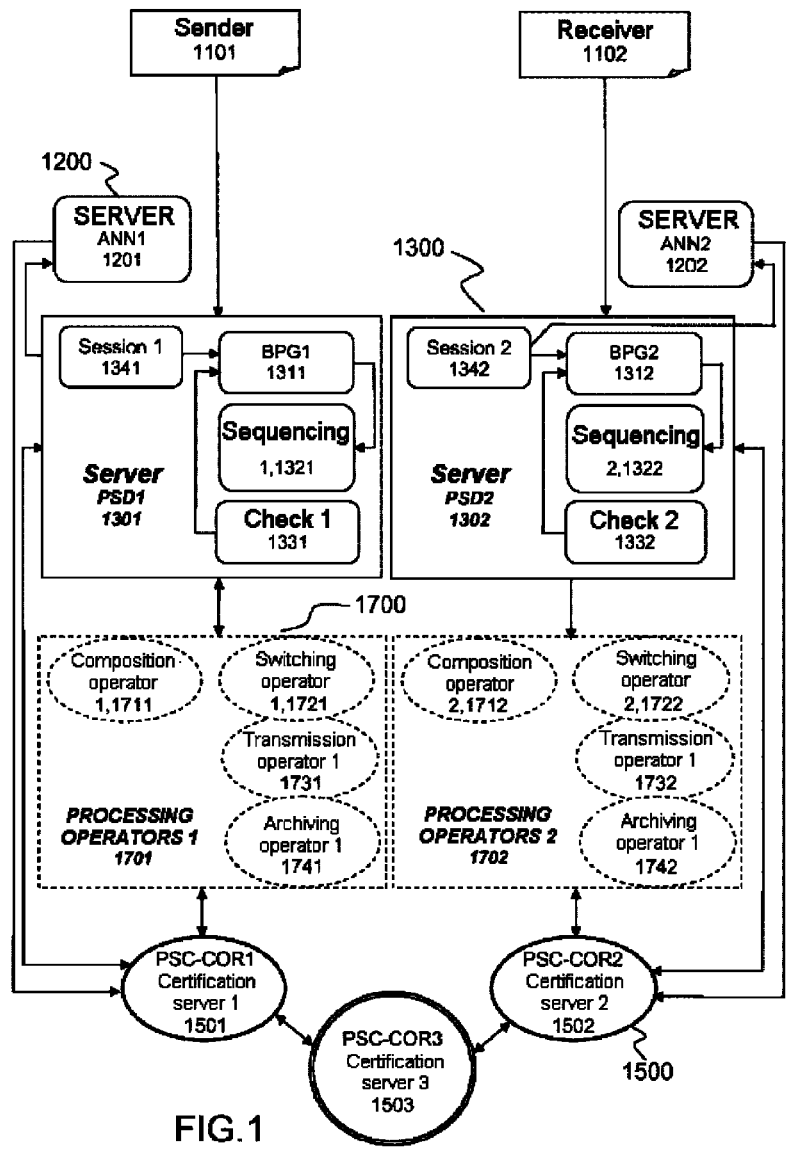
FIG. 1 represents the simplified architecture of a system for secure electronic correspondence in one embodiment of the invention.

In the description, the figures and the claims, the symbols and abbreviations that appear in the table below have the meanings that are indicated therein, unless a different meaning is specified below in the description.

| Abbreviation | Meaning |
| --- | --- |
| ACK | Acknowledgement |
| ADR | User addresses |
| AEML | e-mail address |
| AMP | Ampliation |
| ANN | Directory server |
| APT | Postal address |
| AR | Acknowledgement of receipt |
| ARC | Archiving |
| BPG | Private management office server |
| CCC | Correspondence current account |
| CCU | Universal correspondence convention |
| CMT | Switching |
| COL | Legal authorization chamber |
| COM | Community server |
| COOR | Coordinates of a user (addresses and telephone numbers) |
| CORR | Bilateral correspondence |
| COMP | Composition of an item of electronic correspondence |
| CPA | Composition of the AR |
| CSS | Secure secret code |
| CxC | Multi-channel communication (fax/e-mail) |
| D | Recipient |
| DENO | Personal denomination |
| DOC | Document |
| DOM | Electronic correspondence domiciliation operator |
| DUP | Duplicate |
| E | Sender |
| EDI | Desktop publishing |
| ERP | Enterprise resource planning (or enterprise resource management software) |
| FAR | AR file |
| FC | Content file (text of the document) |
| FD | Descriptor file describing the attributes of the correspondence |
| FDS | Structured data file |
| FGS | Structured management file |
| FIO | Sequence file |
| FPT | Post file |
| H1 | Handover authorization |
| H2 | Transmittal validation authorization |
| H3 | Reception validation authorization |
| H4 | Consultation authorization |
| H5 | Archiving handover authorization |
| H6 | Archiving validation authorization |
| HAB | Authorizations |
| IDP | Personal identity |
| IMMA | Registration of the document |
| J | Token |
| JNA | Traceability registration log |
| MAR | Membership Application Registration |
| MCIS | Matrix of inter-services connectivity |
| MVPD | Matrix of documentary probative value |
| OPEM | Mutualized operator |
| OPEN | National operator |
| OPET | Processing operator |
| OPET-AMP | Processing operator responsible for ampliation |
| OPET-CMT | Processing operator responsible for switching |
| OPET-COMP | Processing operator responsible for composition |
| OPET-TRANS | Processing operator responsible for transmission |
| OPT | Mapping table of a legal operator |
| ORI | Original |
| PF | Pass file (file transfer between service providers) |
| PSC-COR | Correspondence certification service provider |
| PSCE | Electronic certification service provider |
| PSCE-HD | Data-stamping PSCE |
| PSCE-SE | Electronic signature PSCE |
| PSD | Domiciliation service provider |
| RIDD | Documentary identity statement of the recipient |
| RIDE | Documentary identity statement of the sender |
| RTR | Token return |
| SPE | Specimen of document or of AR |
| SSC | Shared services centre |
| SWO | Switch out (transfer between service providers) |
| TCE | Sender mapping table |
| TCEL | Legal sender mapping table |
| TECB | Bilateral correspondence enrolment table |
| TMOB | Mobile telephone number |
| TOCC | Consolidated correspondence sequence table |
| TRF | Transfer |

| Abbreviation | Meaning |
| --- | --- |
| UTIL | User of an electronic correspondence service |
| VERS | Document versions |

FIG. 1 represents the simplified architecture of a system of secure electronic correspondence in one embodiment of the invention.

The dematerialization of the interchanges of documents or correspondence satisfies a productivity gain objective. In particular, the potential gain resulting form a dematerialization of the invoices in France has been worked out at 2% of GDP, or more than 40 billion euros. However, the specifications to be observed so that this dematerialization complies with the legal and regulatory requirements requires the verification of the identity of the sender of the document and the integrity of the said document. However, the dematerialization of the production of millions of documents assumes the installation of real industrial systems for producing the said documents.

As illustrated at the bottom of FIG. 1, new electronic document or correspondence processing operator professions (OPET) 1700 have therefore been created, the main ones of which are the composition operators, the transmission operators, the archiving operators, the bilateral switching operators. The composition operators assemble the documents from data and file overlays. The transmission operators carry out the postal or electronic routing of the documents. The archiving operators conserve the documents on behalf of the senders or the recipients in an original or copy form. The document switching operators create double entries of the movements in the correspondence accounts of each user and operator so as to be able to verify that, after a certain programmable time, every item of correspondence that is sent has its counterpart received. In most cases, the existence of the counterpart must be verified by not later than the end of the day, otherwise the mail that has been sent will be rejected by the system.

It is naturally possible to envisage that all or some of these processing operations are carried out by one and the same operator, for example in a shared service centre as will be seen later on in the description. But in electronic correspondence systems that are designed to cover extensive geographic areas and different legal systems, it is likely that at least two functions must be executed locally: the archiving function, for legal reasons or reasons of public policy, and the transmission portion relating to the multi-channel communication that involves the transmission of fax, the printing, the envelope stuffing and the postal routing that are costly if they are carried out at long distance.

In order for the probative value of an electronic document to be equivalent to that of a document written on paper, it is necessary to be able to guarantee throughout the life of the document the identity of the author and the integrity of his document. This guarantee can be established only if the document production and interchange system is a trust system.

Shown in FIG. 1 is a simplified architecture capable of establishing this trust system. This architecture comprises four types of organizational entities, each entity managing computer servers, databases and software specific to each type, the said entities being connected together via one or more communication networks which may be the public network or private networks on which standard or specialized communication protocols can be used:

A first type of entity consists of sets of users "UTIL" who are senders 1101 and receivers 1102 of correspondence, each set of users being united by a cause causing some of their identification data to be available on one and the same Directory Server or ANN 1200, 1201, 1202;

A second type of entity consists of "Correspondence domiciliation service providers", PSD, 1300, 1301, 1302;

A third type of entity consists of the "Processing operators" (OPET) for processing electronic correspondence, 1700, 1701, 1702;

A fourth type of entity consists of "Correspondence certification service providers" (PSC-COR), 1500.

Explained first are the entities of the first type. In order to make understanding easier, the architecture is shown with two users, a sending user 1110 and a receiving user 1120 belonging to two different directories ANN, 1201 and 1202. The architecture is therefore duplicated in FIG. 1. The system of the invention is configured in order to manage the electronic correspondence between these users as explained further on in the description.

Sets of users grouped together in one and the same directory may be made up for various reasons:

Such a set may be made up of all the employees of an enterprise around the world (or of certain categories of these employees: executive managers; researchers in a given discipline; marketing people responsible for the sale of a given product, etc);

The people governed in a territorial community may naturally form such a set;

A large enterprise may wish to gather around it its suppliers by placing at their disposal an extranet giving them access to reserved information and furthermore requiring them to supply their documents (bids, invoices, user manuals, etc.) according to certain standards;

A system of general or specialist stores, a retail bank, usually provide their clients with access to reserved space on their internet site;

An internet access provider, which usually provides a standard messaging service.

In certain respects, these sets of users united by a common point form communities. It can be seen that this concept may have different meanings depending on the context: a community may include individuals and legal entities, themselves represented by individuals who must have the powers to do this from the moment when the documents produced involve the legal entity that this individual represents. It also results from the very nature of the communities that have just been described that one and the same individual and one and the same legal entity may belong to several different communities. A community defines management rules for registering its adherents which may become users of the services of the community and, optionally, so that the said members can invite people outside of their community to join them. The registration procedure necessarily involves non-electronic interchanges. In summary, this involves verifying the attributes of identification, of addressing and of authentication of the future user. A registered user therefore has a verified identity, validated postal and electronic addresses and at least one means of authentication, these various attributes being described in detail in the rest of the description. These data are stored in a database which forms, in whole or in part, a directory ANN, 1200, 1201, 1202. In order to protect the name-related data, it may be necessary to manage a certain number of data of the database (notably the information relating to the methods of authentication), in a storage space that is logically or even physically distinct from the directory which must be accessible on the network of the community.

These entities of the first type are not specific to the field of electronic correspondence. Their first objective is different (economic, social, etc.), the correspondence service being subordinate to this first objective.

On the other hand, the main objective of the correspondence domiciliation service provider PSD, 1300, is to provide this service to their clients or users. These providers PSD place at the disposal of their clients a private management office (BPG) 1310 which forms a zone specific to each user (or optionally to each entity, when the adherent to the community is an enterprise). It is in this BPG that each sending user places the correspondence that he wishes to send, according to modalities which will be explained in detail further on in the description, and that the correspondence effectively sent and received is stored in a consolidated correspondence account (CCC). The said modalities depend on the type of correspondence. In one embodiment of the invention, 20 types of correspondence, called universal, are defined, between which the sending user can choose. Each type of universal correspondence is associated with a process for establishing the probative value. It is in the BPG that the user designates the OPETs that will process his correspondence. It is also in the BPG that the sending user designates the recipients of his correspondence (who must have signed a bilateral correspondence convention—CCB—or who may be invited to so do). The providers PSD also carry out:

- a function 1320 of preparing and sequencing operations of electronic correspondence, which function consists in distributing the correspondence processes between the operators;
- a function 1330 of checking the operations carried out, as will be seen in the present description.

In practice, entities of the first type may wish to deploy electronic correspondence domiciliation services for their clients. In this case, the entities of the $1^{st}$ and of the $2^{nd}$ types will form a single entity. This will also be the case if PSDs decide to offer direct access to a directory that is specific to them that will be all the larger if the marketing of their services is a success.

The entities of the third type are formed by the OPETs. OPETs by default can be proposed by the PSDs. The OPETs must be approved by the said PSD and conform to the prescribed procedures. A user who manages considerable flows of correspondence may however choose different OPETs for each category of flow or for each category of recipients. The composition, switching, transmission and archiving servers which are represented in FIG. 1 may very well be in different geographic locations, provided that they can communicate with one another according to the modalities prescribed by the manager of the system of the invention, such modalities being described in detail further on in the description. It will be seen, moreover, that the question of knowing whether an OPET executes services within the frontiers of a single country (and therefore potentially of a single PSC-COR, as explained further on), may have its importance. The pressure on the costs of providing services of this type already promotes a centralization of the operations in shared processing centres (shared service centres or SSC) of considerable size that are designed to market their services in several countries. In this case, one and the same OPET will be subjected to different certification policies by different PSC-CORs. Mention will therefore be made in the rest of the description of a mutualized processing operator or OPEM. The OPETs that are subjected to only one certification policy will be called OPEN or national processing operators.

The entities of the fourth type are formed by the PSC-CORs which manage certification servers 1500, 1501, 1502. The PSC-CORs have the final responsibility to guarantee the probative value of the electronic correspondence that is interchanged in the system of the invention. Since this probative value is defined by national legislative and regulatory frameworks, it is advantageous to envisage that the responsibility of a PSC-COR be established in a national framework, or at least be compliant with that of each national legislation. It is for this reason that it is necessary to envisage one or more PSC-CORs of a particular type, being responsible for ensuring the legal interoperability of the first-level PSC-CORs. It is an architecture of this type that is shown in FIG. 1. It is however possible to envisage an architecture with more than two levels of PSC-COR without departing from the scope of the present invention.

It is also possible to envisage that a PSC-COR carries out PSD functions. On the organizational level, this does not pose a particular problem because the two entities have a role of registering users (PSD), sequencing the operations of the OPETs (PSD) and checking (PSC-COR) the said operations and cooperate in order to achieve the highest probative value. On the technical level, the architecture will usually provide preferably two distinct servers each performing a portion of the functions of the system.

Each PSC-COR must establish links with operators of a particular type which, in one embodiment of the invention, are of two types, encompassed in a general category of electronic certification service providers (PSCE), which are not specific to the operations of secure electronic correspondence:

- A first type of PSCE is formed by the electronic signature PSCEs (PSCE/SE); the electronic signature usually uses cryptographic techniques which, to have probative value, require an authorization delivered by governmental authorities; a PSCE/SE manages a database of the encryption keys used for the electronic signature; it must be capable of keeping the repudiated or revoked keys up to date (by their holder or an authorized authority, notably in the case of fraudulent or dubious use) in order to be able to guarantee that a key used at a given moment is valid; the certification server interrogates the said database of the PSCE/SE either every time an electronic signature is used in the system, or in batches at frequencies making a compromise between the reliability of the system and the load of the computer system;
- A second type of PSCE is formed by the date-stamping PSCEs (PSCE/HD); the date stamping is used to give a certain date, in synchronism with an atomic clock, to the documents that are subjected to this procedure; the PSCE/HDs must also have approval; the certification server sends a request to the PSCE/HD for the date stamping of a message digest of the document to be date stamped and the date-stamping certificate that it receives in return is sealed with the document.

It is perfectly possible to envisage, in the context of the system of the invention, that certain of the functions indicated above are carried out by a PSC-COR, provided that the PSC-COR has the necessary approvals. However, the trust system will have a higher probative value if the PSC-CORs and PSCEs of the two types are independent of one another.

Since the general functional architecture of the system of the invention has now been described, it is appropriate to describe one of its main features consisting of a module for the management of sessions of electronic correspondence. A session is initiated with a server of a PSD 1200, 1201, 1202 by a sending user 1101 who wants to send electronic correspondence. It may also be initiated by a receiving user 1102 who wishes to study an item of correspondence of which he has received notification and acknowledge receipt thereof. Several types of sessions may be defined. A session combines several processes making it possible to carry out the operations of electronic correspondence and their certification when their execution is compliant.

Figure 2:
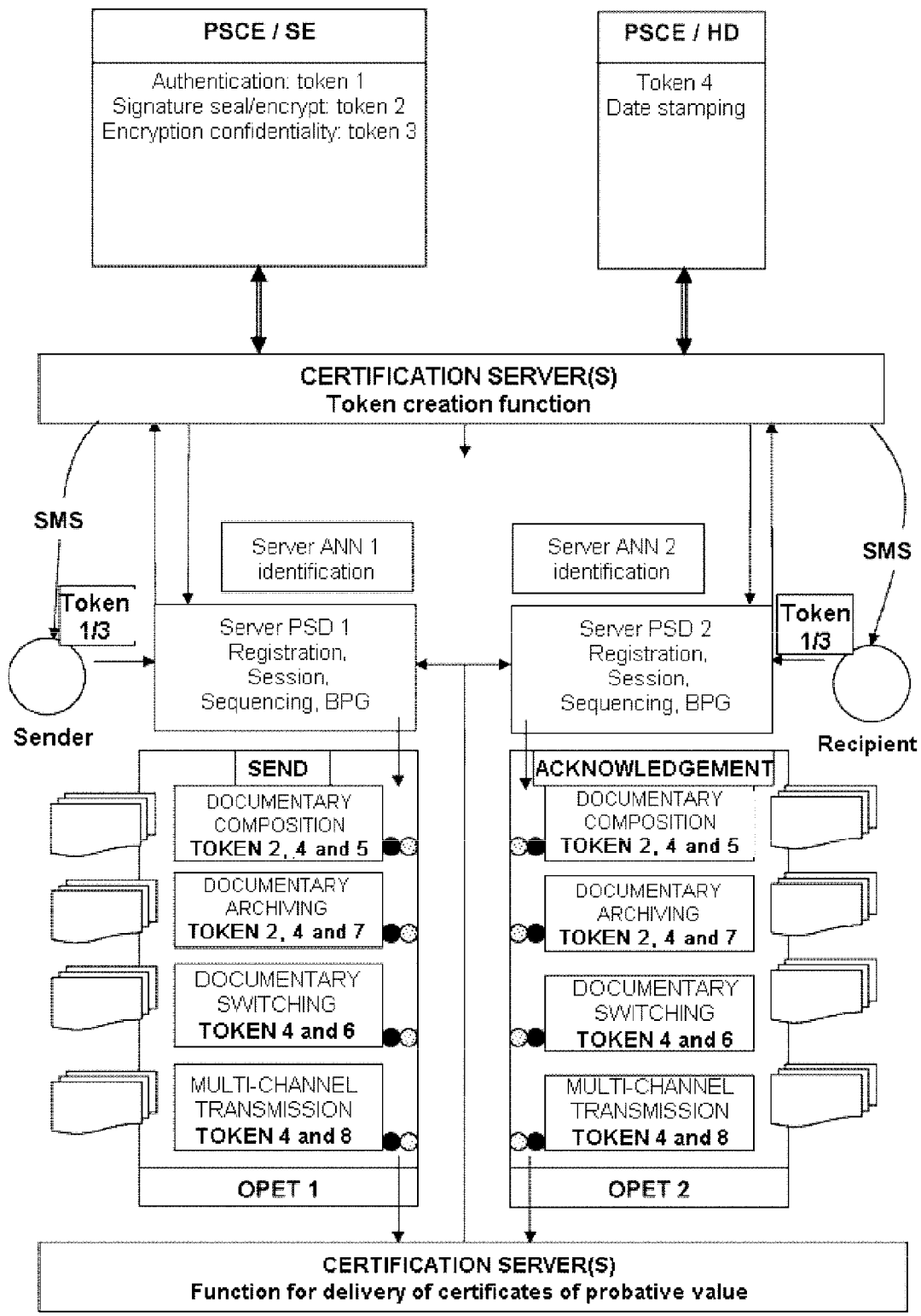
FIG. 2 represents the links between the various players in a system of secure electronic correspondence in one embodiment of the invention.

FIG. 2 represents the links between the various players of a system of secure electronic correspondence in one embodiment of the invention.

A second important feature of the invention is that it provides for the creation for each type of correspondence of a set of certification tokens. In the example of FIG. 2, it is possible to identify the main tokens specific to each of the steps of the process for producing an item of secure electronic correspondence. These tokens are created by the certification server during the various sessions and are sent to the various players in the system for processing the electronic correspondence processed during the session (PSD and OPET). Certain tokens must be validated by the PSCEs. The tokens are returned to the PSC-COR when they have received their final validation. When it has collected all the tokens originating from all the players and has verified the completeness of coverage of the correspondence processing operations, the certification server delivers a certificate of probative value to the management server.

FIG. 3 defines the certification tokens used by the processing operations in one embodiment of the invention.

Tokens that are defined for the application of the invention are certification tokens of which the circulation in connection with that of the documents that are the subject of the electronic correspondence operation makes it possible to validate the completion of each of the sub-operations in conformity with the specifications defined by the PSC-COR(s) which is/are involved in the electronic correspondence operation in order to ensure overall and bilateral conformity.

In the embodiment that is described, 18 certification tokens have been defined. According to the breakdown of the document production and transmission process, it may be advantageous to provide more or less tokens. The definition of the tokens illustrated by the figure is therefore in no way limiting. Each type of correspondence (TYPCO) in the universal naming scheme has a defined and characteristic number of tokens which determine its maximum probative value on the scoring scale of items of correspondence defined by the PSC-COR.

The table in the figure indicates for each token the type of session during which it is used (the said types being defined in the remarks below relating to FIG. 4), the services and operations that they cover, the service provider(s) concerned, the server to which the token is addressed at the end of the journey.

The various services and operations with which the tokens are associated are now described succinctly, some of them being the subject of explanations in the rest of the description:

J1 is for validating the sequencing operation which consists in defining the list and sequence of the operations for processing an item of electronic correspondence and the identity of the OPET which must carry out each of them; the operation to be carried out is the generation of files comprising the type of universal correspondence, the data to be used, the presentation models, the rules of composition and the operators to be used;

J2 traces the composition of an item of correspondence, an operation which involves generating the items of correspondence themselves from the FGSs; the operation to be carried out is the generation of specimens SPE (in a number defined as a function of the type of correspondence and of the number of recipients), based on which, after validation of the correspondence by the sender, derivative versions will be produced (originals, duplicates DUP, management file, etc.);

J3 is a transmittal report and indicates which version of the document is chosen to be sent;

J4 allows the validation of the ampliation which consists in generating derivative versions in a programmable and limited number;

J5 and J6 are used to validate the archiving of the originals of the sender and of the recipients which is done in an electronic safe on the premises of a specialized operator, preferably in encrypted mode, optionally with conservation of the necessary keys on the premises of a third party custodian;

J7 and J8 are used to validate the switching of the duplicates for the sender and the recipients; switching is an operation making it possible to ensure that every electronic correspondence operation has a counterpart (transmission/reception; duplicate/original); it is the principle of bilaterality which makes it possible to make the whole electronic correspondence system reliable; this principle of bilaterality means that any movement of correspondence is considered to be an accounting entry that cannot be entered into a correspondence account (which is like a double-entry financial account) unless its counterpart is registered in another correspondence account; provisionally, an item of correspondence may pass through a suspense account; the entry will not be made if the counterpart has not arrived at the end of a programmable time;

J9 validates the generation of a printing file close to a recipient who must receive a paper original for archiving it;

J10 validates the secure transmittal by fax or e-mail (multi-channel communication);

J11 validates the transfer of the data used for generating electronic correspondence based on an ERP via the generation of a structured management file (FGS);

J12 validates the creation of a coupon for the management of an acknowledgement of receipt (AR); a management coupon is a secondary document attached to the main document, the model of which is defined as a function of the type of correspondence; this management coupon is made available to a designated operator in order to establish it subsequently; the coupon token is placed temporarily in the BPG of the operator that is responsible for activating it subsequently in order to sequence the composition of the desired original on the premises of the corresponding management coupon operator;

J13 to J18 are the equivalents of J3 to J8 for the ARs.

The service providers and operators concerned are the PSD of the sender (PSD1) and of the recipient(s) (PSD2) and the OPETs of the sender (OPEM1, OPEN1) and of the recipient(s) (OPEM2, OPEN2). Specifically, only the archiving of the originals and of the ARs, optionally the multi-channel communication, must usually be handed over to national operators.

Figure 4:
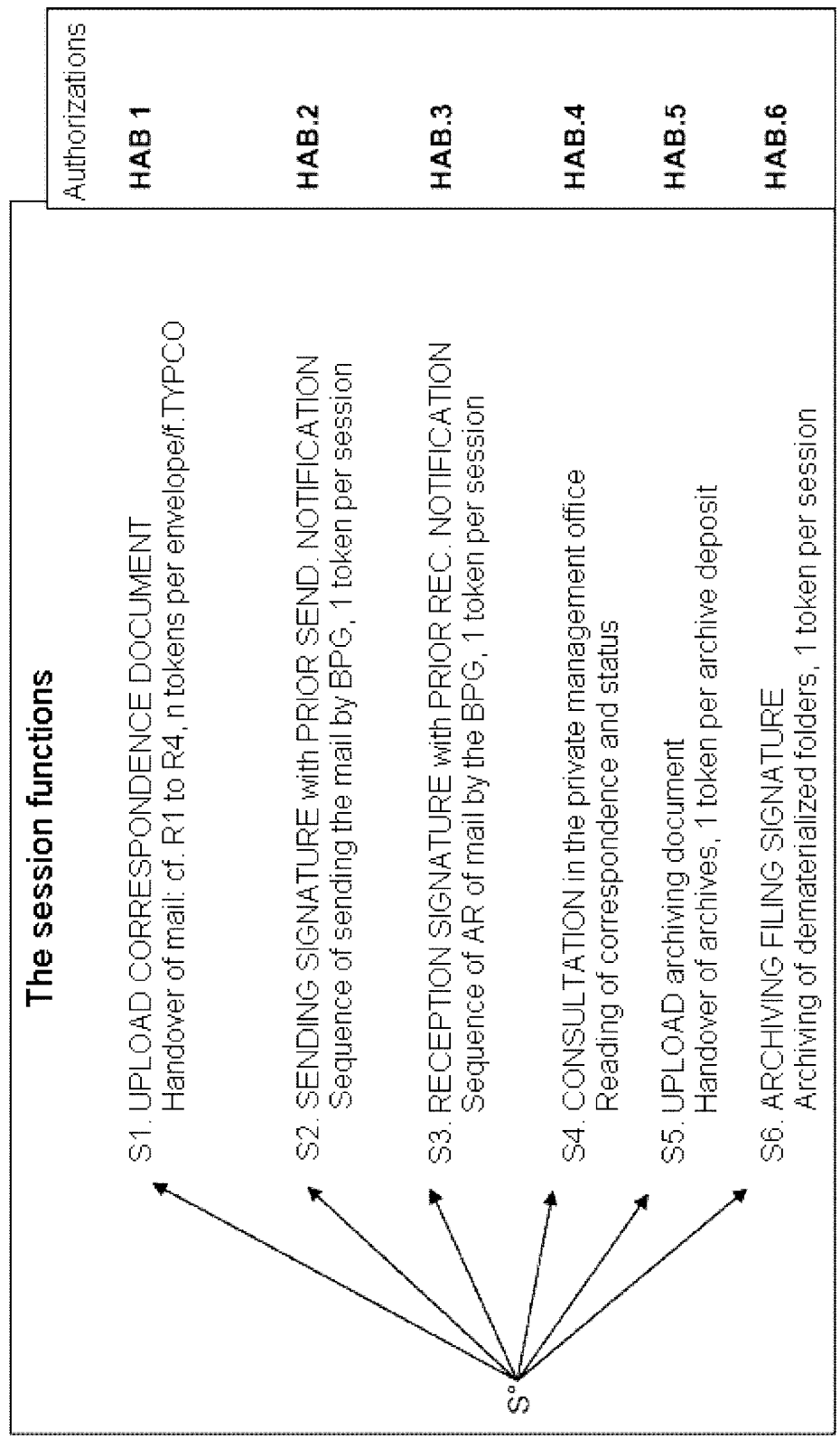
FIG. 4 represents the various types of session that can be used in one embodiment of the invention.

FIG. 4 represents the various types of session that can be used in one embodiment of the invention.

In one embodiment of the invention, in a module 1341, 1342 for managing sessions of secure electronic correspondence, six types of sessions are defined that are briefly described below, each of the types then forming the subject of a detailed description in connection with the following figures.

The session of type $S_0$ is an entry point that is common to all the other types of session. It makes it possible to authenticate not only the user but all of the players that will be involved in the session to come (type $S_1$ to $S_6$). The number and the nature of the authentications to be carried out at the stage of the session $S_0$ will therefore depend on the type of session to come that the user must indicate when he logs in.

The session of type $S_1$ allows a sending user to place in his BPG a set of documents that he wishes to transform into electronic correspondence. A session of this type in particular manages the choice of the electronic routing path and the creation and circulation of the certification tokens as a function of the type of correspondence.

The session of type $S_2$ allows the sender to validate, by his signature or that of an agent, the sending of an item of electronic correspondence after composition.

The session of type $S_3$ allows a recipient to validate, by his signature or that of an agent, the receipt of an item of electronic correspondence and to send, if necessary, an acknowledgement of receipt, after first notifying the recipients of the arrival of an item of correspondence that is intended for them.

The session of type $S_4$ allows a sending or receiving user to gain access to his BPG in order to examine the items of correspondence sent or received, work in progress (drafts, intermediate states, transmittals not yet validated, notifications of receipt not closed, etc.) and, optionally, in order to consult the various rules for managing the application for managing electronic correspondence specific to a user or a set of users, the management mandates and the conventions of universal correspondence or the conventions of bilateral correspondence.

The session of type $S_5$ allows a user to hand over to his BPG documents to be archived.

The session of type $S_6$ allows a user to validate, by his signature or that of an agent, the archiving of the folders handed over and therefore to trigger the said archiving by filing the items of correspondence in electronic folders.

Each type of session corresponds to a type of authorization (type $H_1$ to $H_6$, respectively for the sessions of type $S_1$ to $S_6$) the field and the specifications of which are a function of the type of operations to be carried out in the type of session for which the authorization is delivered.

Sessions of other types may be added (for example a session specific to a process for validating invoices such as a payment proposal) without the system using them necessarily departing from the field of the invention which does not relate to a determined set of sessions but to processes used in all or some of the said sessions.

Figure 5:
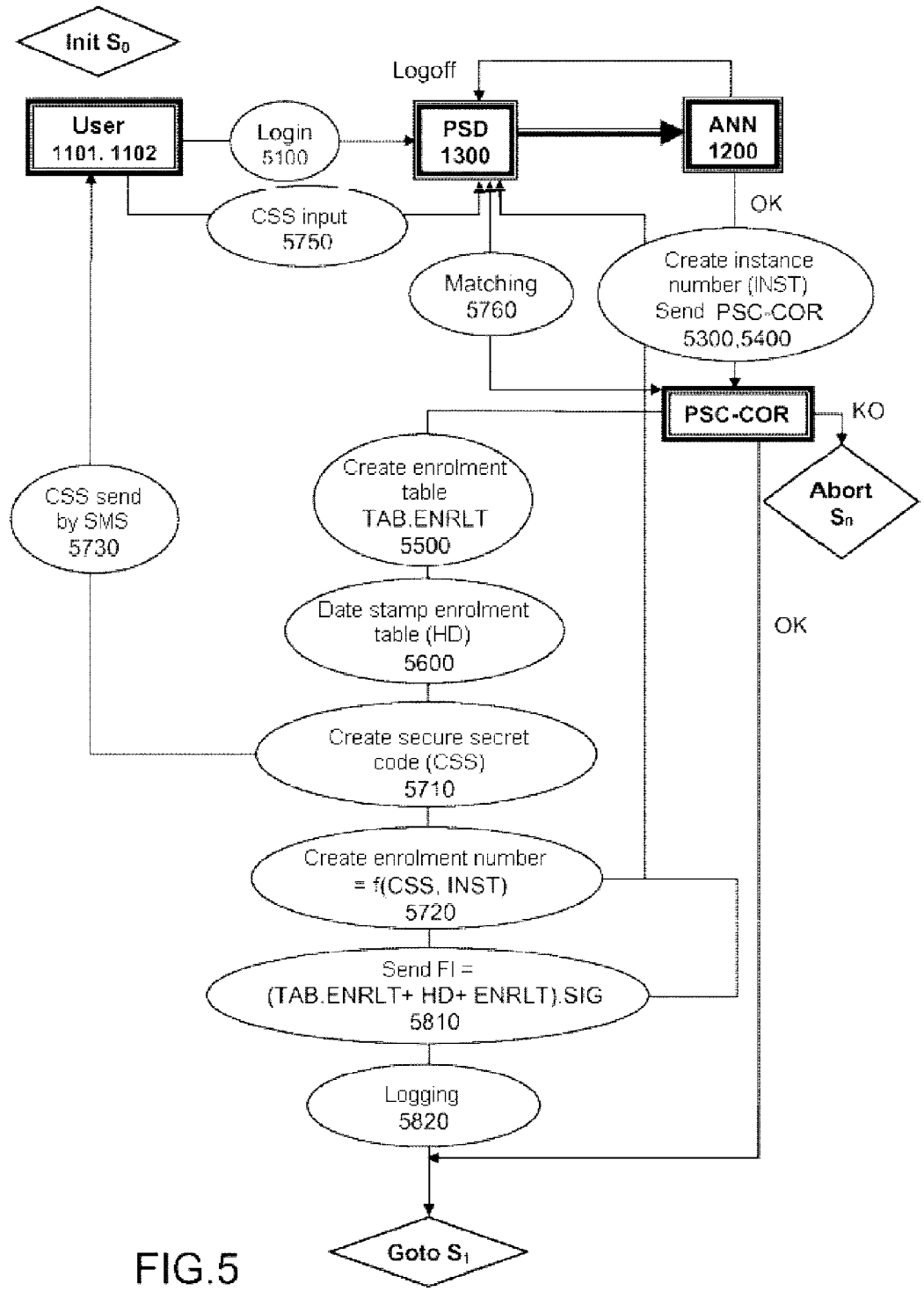
FIG. 5 represents a flow chart of the processing operations for applying a session of type $S_0$ in one embodiment of the invention.

FIG. 5 represents a flow chart of the processing operations for implementing a session of type $S_0$ in one embodiment of the invention.

Figure 6:
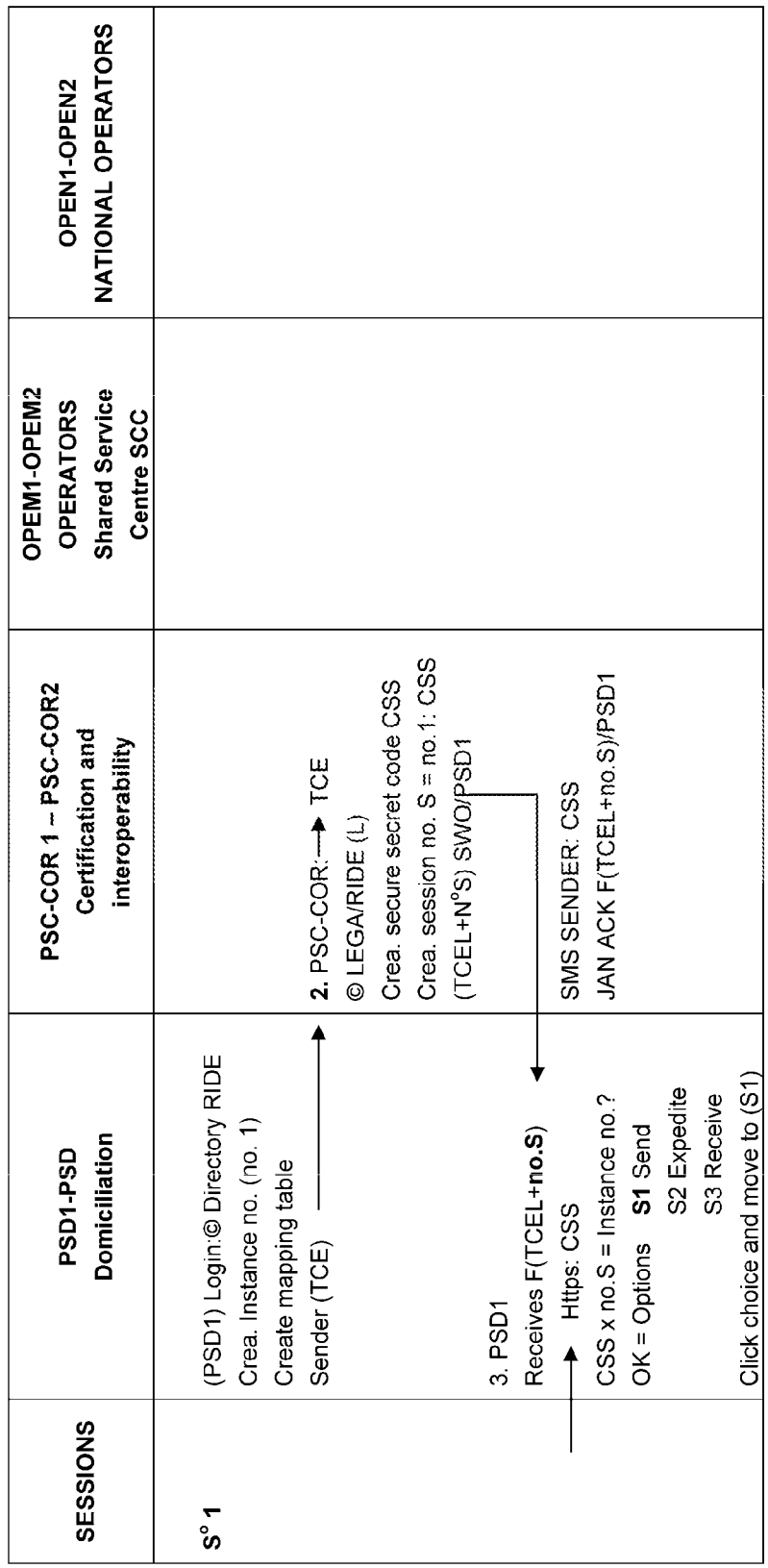
FIG. 6 represents the data flows managed by a session of type $S_0$ in one embodiment of the invention.

FIG. 6 represents the data flows managed by a function $S_0$ in one embodiment of the invention.

Figure 7:
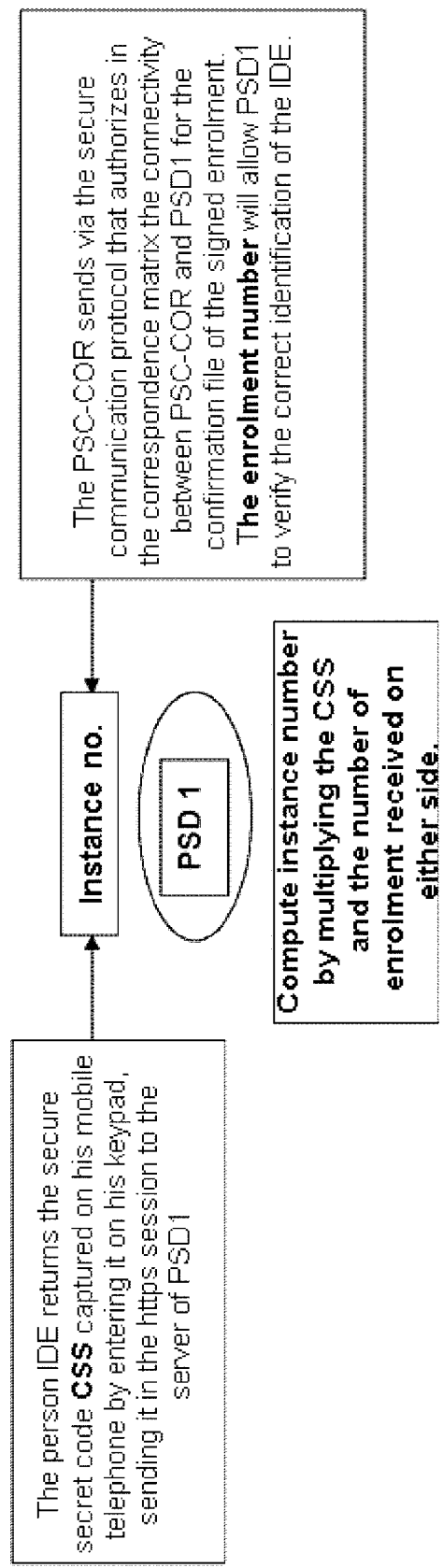
FIG. 7 represents a schematic diagram of an enrolment procedure used for each session of type $S_0$ in one embodiment of the invention.

FIG. 7 represents a schematic diagram of an enrolment procedure applied by the function $S_0$ in one embodiment of the invention.

FIGS. 8a to 8d represent tables which can be used for the application of the function $S_0$ in one embodiment of the invention.

These FIGS. 5 to 8 are explained in a combined manner in the rest of the description because they relate to all the sessions of type $S_0$.

The sessions of all types are preceded by a session of type $S_0$. The $1^{st}$ step 5100 of a session of this type is the user logging into the domiciliation server 1200, 1201, 1202. A consolidated correspondence account (CCC) and a document identity statement (RID) have previously been allocated to a user following a registration procedure. The CCC gives the user a consolidation of the correspondence accounts (CC) that he may hold with several OPETs.

The $2^{nd}$ step 5200 is, as in any procedure for connecting to a server, the search for the identity of the user in the directory ANN 1200. A search is also made in the other directories to which the BPG 1310 of the user may have had access during preceding sessions, and in the directories of the PSC-COR. Connection is refused when the user who is trying to connect does not appear in one of the interrogated directories. The user must also indicate which session he would like to run after the opening session, the content of the checks made during the latter depending on the session that will follow.

The BPG extracts the RID and the identity TIT of the holder of the RID. A holder may be either an individual or a legal entity which will have habilitated one or more individuals, optionally at different levels for carrying out in its name the various operations of electronic correspondence. In order to be habilitated to carry out operations of electronic correspondence in the system of the invention, each holder (TIT) must have signed a universal correspondence convention (CCU) with an operator DOM. This convention defines notably the authorizations delivered to legal representatives of its organization and the mandates given to its PSD operator and to the OPETs for carrying out in its name the sending, receiving, archiving and, where appropriate other, operations.

According to the management rules defined by the PSC-COR, the holder is the subject of a scoring NOT for his digital identity. The scoring of the digital identity may be defined on a scale ranging for example from 0 to 4. At zero, this is an insufficient personal registration, with no proofs, or cancelled either at the request of the person (removal of the account), or because there is an index or a cause of cancellation (for example, the address or the national domiciliation is found to be false, rogatory commission of suspension of the service, etc.). If the session to follow is a handover of documents for sending, the session opening will be filtered depending on the type of correspondence that the sending user wishes to hand over and on his NOT level.

For each user, the directories contain his PSC-COR and his OPETs.

The RID comprises two portions:
  the first contains the trust attributes, the address book, the CCUs and the bilateral mail conventions (GCBs),
  and the second portion contains the identification data of the BPG of the user which contain the inventory of the flows of correspondence in progress or undertaken with the states and the certificates of the intermediate operations.

Based on these various elements which characterize the digital identity of a holder and of the persons that represent it, a TABLE RID is defined of which an example is shown by FIG. 8a. The top line outside the table characterizes the legal entity holder with indication of the PSD, of the PSC-COR and of the OPETs to which it is attached and the lines of the table relate to the individuals attached to the legal entity, with indication of their name (DENO), of their e-mail address (AEML), of their mobile telephone number (TMOB) and of their authorizations ($H_1$ to $H_6$).

In order to move to the $3^{rd}$ step 5300 of the process of the session $S_0$, the RID table of FIG. 8a must be complete.

If this is the case, an INSTANCE number or a HANDOVER number (INST no. or REM no.) is created which is the sequence number at a given moment of the session opening (or of handover, when the session is a handover session for sending or for archiving). An example of an 18-digit INST/REM no. is given in FIG. 8b. The handover number is independent of the number of transmittals or of recipients. It is specific to each session instance $S_0$.

In the course of a $4^{th}$ step 5400, the management server 1200 submits the RID table and the INST/REM no. to the certification server 1500 of the PSC-COR to which the PSD operator of the user is attached.

Then the steps called "enrolment" begin which are used to verify all the trust attributes of the user.

The $5^{th}$ step 5500 of the process of the session $S_0$ includes the completion by the PSC-COR of a table TAB.ENRLT/RID like that given as an example in FIG. 8c.

An example of the verifications that may be made is given below without this list having to be considered obligatory or limiting, because it may change depending on the applicable regulation and/or on the context of use of the system of the invention. Depending on the type of session following the session $S_0$, the verifications below may or may not be carried out.

The PSC-COR verifies, by completing the zones of the RID table, that the adherent is indeed enrolled in his country, that is to say subjected to the security measures, or to the local and national security policy. It then verifies that this adherent has all the attributes for managing one or more hybrid or dematerialized items of correspondence. As such, the PSC-COR verifies that the addresses of the adherent are held for handing over the information or disclosing to this holder or to its representatives messages (notification) that are notably necessary for the validation for the transmittal and for the receipt of the documents interchanged between the parties bilaterally. The PSC-COR also verifies that the various conventions binding the user to his PSD operator, and the latter to the competent PSC-COR, are indeed currently valid. The PSC-COR then verifies that the service providers of the user (PSD 1300 and OPET 1700) have the currently valid powers and electronic signatures that are necessary, and that the IP addresses of the servers that they use are held. The PSC-COR verifies that these elements are valid and useable and for which types of correspondence they are valid.

If a handover session opening is being carried out and the sending user indicates that the operations are entrusted to several OPETs acting on behalf of the sender but also of each of the recipients, by distributing the roles for the composition, the archiving, the switching and the multi-channel transmission, the PSC-COR must verify for each of them that a signed and valid service mandate, one or more valid electronic signatures depending on the number of subcontracting operations, and an IP address for each communication server channelling the interchanges between the players of the dematerialization operations exist.

During this step 5500, for each session $S_0$ presented by an adherent to PSD 1300, the PSC-COR must interrogate the PSCE-SE(s) and PSCE-HD(s) that are approved on the national territory so as to verify that the electronic signatures used in the processes are valid, and get a time stamp from a PSCE-HD. The PSC-COR must therefore normally check each:

electronic signature with the PSCE-SE that registered it
date stamping on the atomic clock chosen in the time zone and the country concerned.

A request to the revocation server PSCE-SE is used to verify that the digital identity specific to each signature is currently valid. The revocation server delivers an attestation of validity which makes it possible to establish the probative value of the sealing, of the archiving, and of the secure transfer of data. All the signatures that an OPET uses in the operations for processing the dematerialized correspondence must therefore be verified (between two and three signatures for each operator in a usual operation).

When the sender and certain recipients also have electronic signatures (scoring of their digital identity being equal to 4), they may then have, on request, an electronic signature for personally signing before transmitting the documents that the sender hands over to the BPG of his PSD; these signatures must also be verified by the PSC-COR before launching the correspondence process depending on the chosen type of dematerialized correspondence. In order to ensure the real time of the processing of volumes of correspondence instructions that may reach several millions, the PSC-COR takes measures so as to conserve the public key of each adherent and of each OPET and carry out an update at the desired frequency of the information stored on the revocation servers. By thus mutualizing the checking of the signatures, the PSC-COR can at any time know whether or not a signature is unsatisfactory and provide proof that the latter is not on the revocation list that it has consulted. The proof of validity of each electronic signature used for sealing, date stamping, archiving and transmission is necessary in order to finally establish the certificate or the guarantee of the probative value of the bilateral correspondence and of the legal archiving.

If the enrolment table TAB.ENRLT/RID is properly completed for the RID/INST no./REM, the PSC-COR endorses the transition to the $6^{th}$ step 5600.

The latter consists in date stamping the enrolment table TAB.ENRLT/RID. For this, a date-stamping request is sent by the PSC-COR to a PSCE/HD which is synchronized with a time base, the one normally used in its country and recognized by the public authorities, notably for fiscal transactions.

The $7^{th}$ step 5700, which is illustrated in FIG. 7, consists in authenticating the user strongly via the certification server 1700. A preferred strong authentification method in the system of the invention comprises:

a $1^{st}$ sub-step 5710 of creating a secure secret code (CSS) which is a random number, for example of 7 to 9 digits;

a $2^{nd}$ sub-step 5720 of creating an ENROLEMENT NUMBER (ENRLT no.); in a preferred embodiment, this ENRLT no. is equal to a simple function of REM no./INST and of CSS, for example a division, but this may equally be another arithmetic function or a more complex function; this ENRLT no. is written in the enrolment log that is updated every day;

the $3^{rd}$ sub-step 5730 is the communication of the CSS to the user, preferably via an SMS (Short Message System) message sent to his mobile telephone;

the $4^{th}$ sub-step 5740 is the communication of the ENRLT no. by the certification server of the PSC-COR 1700 to the PSD server 1300;

the $5^{th}$ sub-step 5750 is the entering by the user of the CSS that he has received in the input interface of the management server (it being observed that, in a preferred embodiment, the duration of validity of the CSS is ephemeral, for example of the order of 30 seconds);

the $6^{th}$ sub-step 5760 consists in carrying out the matching of the CSS with that extracted from the ENRLT no. by application of the function that is the reverse of that applied at the time of the computation; if the matching is positive, the next session (of type $S_1$ to $S_6$) can be opened; failing this the session $S_0$ concludes with an "abort"; the proof of the positive "matching" is date stamped.

In the event of a positive outcome of the $7^{th}$ step, the opening process can continue with the $8^{th}$ step 5810, 5820 during which the certification server 1500 sends to the PSD server 1300 the file consisting of TAB.ENRLT, HD, ENRLT no., for which it has given its signature [FI (TAB.ENRLT+HD+ENRLT no.).SIG] then logs the session-opening operations.

An example of an enrolment log is shown in FIG. 8d. The log comprises in particular the indication of the references of the AER or ACK that are necessary, in particular, the ACK of the input of the CSS and of the FI.SIG by the PSD server 1300.

The PSD server 1300, which had submitted its RID table with the INST no./REM, therefore receives in return a confirmation of the validity of the session that has just been opened with a session no. (of type $S_1$ to $S_6$) which is nothing other than the confirmation of the validity of the current enrolment. At this stage, the enrolment only confirms that the sending holder is known (with the necessary authorizations) and that its service providers have the required entitlements to launch the document dematerialization. The message from the PSC-COR is signed by it with the prior proof of the validity of its signature.

From the moment when the identification of the adherent is terminated with the validation of his attributes and of the powers granted to his service providers, he may, depending on his authorizations, download from his BPG or from his local workstation, the signed documents or the data files intended to be dematerialized in order to carry out, with one or more service providers, the electronic movements of correspondence and of archiving in a bilateral manner.

FIG. 7 is a view of the sequence of a session of type $S_0$ which represents another logical presentation of the elements that have just been presented.

Figure 9A:
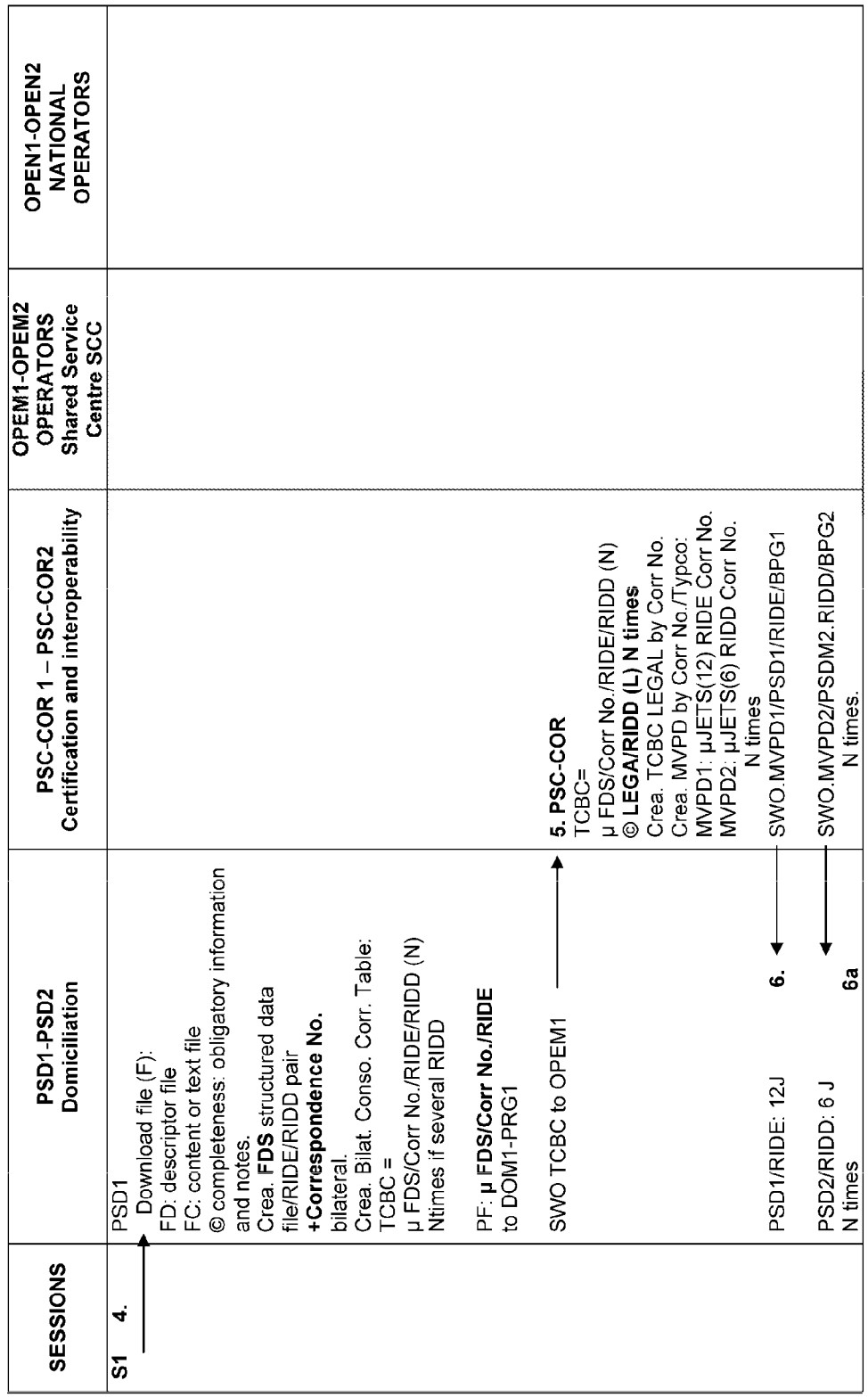
FIG. 9 represents the data flows managed by a session of type $S_1$ in one embodiment of the invention.
Figure 9B:
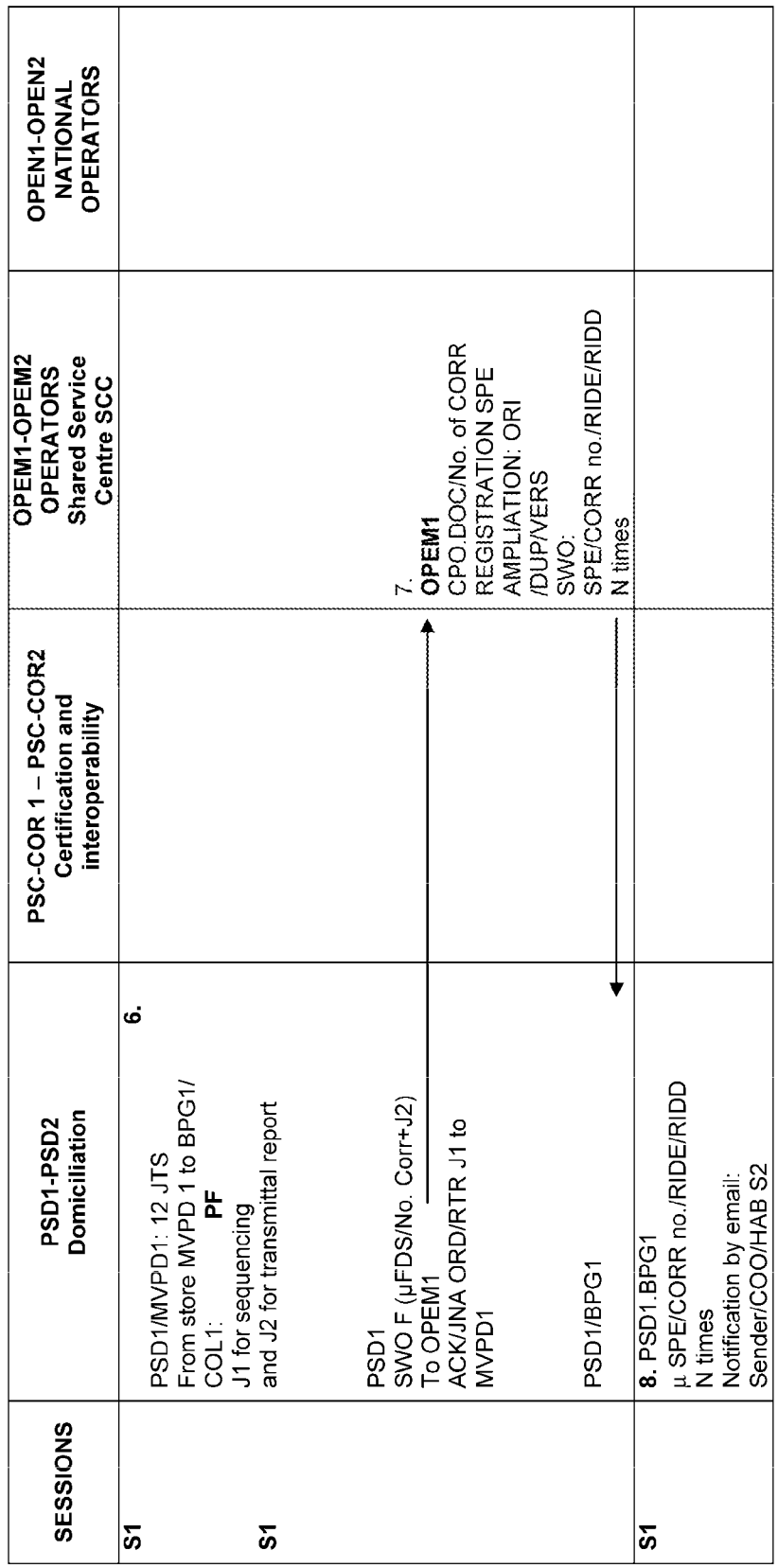

FIG. 9 represents the data flows managed by a session of type $S_1$ in one embodiment of the invention.

FIGS. 10a to 10h represent tables which may be used for implementing a session of type $S_1$ in one embodiment of the invention.

They are explained jointly in order to explain the processes used during a session of type $S_1$.

During a session of type $S_1$, a sending user 1101 hands over to his BPG 1310 the elements of electronic correspondence that he wishes to send.

The $1^{st}$ step of a session of this type is therefore the downloading of a sequence file (FIO) comprising a "descriptor file" FD and a content file FC. In one embodiment of the invention, the FD comprises:
  the indication of the envisaged correspondence type (TYPCO);
  the list of intended recipients with their RIDs.

For each correspondence/recipients pair, the BPG must know (or failing this obtain from the PSC-COR of the recipient for which there is missing information):
  the references of the BPG of the recipient;
  optionally the identity of his PSD;
  the identity of his OCID;
  the identity of the OPET(s);
  the score of the digital identity of the recipient (in one embodiment of the invention, the total of the two digital identity scores of the sender and of the recipient must be greater than a threshold set by the PSC-COR so that the latter can certify the probative value of the envisaged correspondence);
  the nature of the network used; the characteristics of a communications network comprising four sub-networks of different types, $R_1$ to $R_4$, in order to use the system of the invention will be explained in detail further on in the description.

An example of an FIO is given by FIG. 10a.

The files processed by the secure operations of electronic correspondence comprise mainly a content file (FC), usually a PDF file, and a descriptor file (FD) which comprises descriptive elements of the document or of the operations to be carried out, such as the RIDD (essential information) and management information.

During a $2^{nd}$ step of a session of type $S_1$, the PSD server 1300 must then, after having completed, as necessary, the characteristics of the two parties to each item of correspondence, check the data or the FC file, and then allocate sequence numbers:
  check of the integrity of the data or of the downloaded file;
  statement of the weight of the data or of the file.

For all of the correspondence pairs established in the FD and conforming to the checks made, the BPG 1310 establishes a root number which is specific to each validated download. There is therefore, for each handover number REM, a session or an enrolment number and then a root number for following the data and the downloaded files. If all these checks and statements are positive, the BPG assigns to each correspondence pair, for the data or the file to be processed, a "unique correspondence number" which will follow the whole chain of dematerialization operations.

During a $3^{rd}$ step of a session of type $S_1$, the BPG 1310 verifies the completeness of all the information needed to carry out the routing of the items of correspondence to be sent and for establishing a consolidated correspondence sequence table (TOCC).

In one embodiment of the invention, the $3^{rd}$ step is divided into 3 sub-steps:
  A $1^{st}$ sub-step consists in verifying the completeness of the routing information;
  A $2^{nd}$ sub-step consists in verifying that the presentation of the files to be transmitted conforms to the specification of the model service defined by the type of correspondence (TYPCO), optionally in verifying the presence of essential management information prescribed by the applicable COB or by the government authorities of the country of the sender and/or of the country of the recipient, in order to establish the TOCC;
  A $3^{rd}$ sub-step consists in producing a validation log (JN) containing all the checks that have been made.

$1^{st}$ sub-step of the $3^{rd}$ step of a session of type $S_1$:COM©network:REM no./ENRLT no./RACINE no.

Completeness consists in verifying on the one hand that the PSD/BPG holds all the information on the domiciliation (addresses, coordinates) and on the routing of the recipients which may be followed by PSDs, PSC-CORs and OPETs that differ from those of the sender.

For each item of correspondence, the routing is the trust system linking, on either side, the PSD(s), one or two PSC-CORs, with several OPETs depending on the nature of the network used ($R_1$ to $R_4$ as explained in detail further on in the description). These items of information are normally incorporated into the RIDs of the various correspondents. But, if the sender does not know the RIDs of the recipients, he can correspond only by post, by e-mail or by fax, since the recipient does not yet hold a correspondence account. The last resort for ascertaining the RID of a recipient is to interrogate the PSC-COR. But it is not sufficient for a dematerialized correspondence since that always requires between the parties the prior signature of a COB (which must be preceded or accompanied by the signature of a CCU). If the intended recipient for an item of correspondence does not hold a CC account, the sender may accompany his mail, which will finally be routed by post, with an electronic invitation which recommends that the recipient be registered with a PSD (proposed list) and thus hold a current correspondence account allowing him to conserve the electronic trace of all his incoming and outgoing documents. If this invitation is accepted by his recipient, it leads to a registration procedure. This registration procedure takes place on the PSD server chosen by the invitee during a particular session (membership application registration, MAR) during which, in one embodiment:

the invitee must supply his identification attributes (identification of his company, if the request is made for this reason; personal identification; his address (ADR); his TMOB references (for the strong authentication procedure that is necessary for opening a session of type $S_0$), AEML (for receiving his correspondence and notifications); telephone and fax numbers (optional);

the invitee must accept (by double clicking the zones provided for this purpose in the documents) the CCUs of the PSD and COB of the inviting party, these acceptances being routed to the PSD, the competent PSC-COR and the OPETs chosen from a list;

the invitee must supply an identifier and a password;

he must choose whether he wishes to use an electronic signature.

The requester may have to justify certain of his attributes by sending proofs (EDF invoice for domiciliation; telecommunication operator invoice for TMOB). In this case, the registration request will not be accepted by the PSD until the requested documents have been received and checked. In certain countries, the allocation of an electronic signature requires a face-to-face procedure with a representative of the PSCE-SE in a registration office, a procedure during which a signature identifier and password are handed over to the user at the same time as the hardware medium (smart card, USB key) and the software elements needed for carrying out the signature procedure. The said proof documents and the audit trail of the MAR session are archived by the PSD. After registration, the user may carry out the operations provided by the CCU and the COB and only those operations.

If the receiving user is registered, for each sender/recipient pair, the BPG verifies that it holds the correspondence information for the listed recipient(s), before interrogating the PSD-COR which holds a national or regional directory:

identical or different directory;
identical or different PSC-COR;
identical or different OPETs;
domiciliation characteristics for the sender and for the recipient;
  for the sender: an e-mail address (AEML) and a mobile telephone number (TMOB) for responding to the notification for validation of the transmittal;
  for the recipient: an e-mail address (AEML) and a mobile telephone number (TMOB) for responding to the notification for validation of the transmittal;
  for the sender/recipient pair: postal address and/or e fax for addressing the items of correspondence in case the above information is missing.

The type of network for each sender/recipient pair: the BPG server must identify on which type of network it will carry out the sequencing (see further on in the description);

The correspondence number for each sender/recipient pair for an item of correspondence: each correspondence envelope to be produced by the OPET(s) of the sender and by the OPET(s) of the recipient (for example in order to formalize the acknowledgement of receipt) receives a particular correspondence no.

$2^{nd}$ sub-step of the $3^{rd}$ step of a session of type $S_1$:PSD© of COMPLETENESS/Production of the TOCC table The verification of completeness is carried out on the content of each file handover to be processed: FIO="descriptor file" and "content files". It consists in verifying that the presentation of the file conforms to that mentioned in the specifications of the TYPCO. In order to process each correspondence, the sender must comply with a presentation which depends on the type of correspondence chosen for each recipient. Depending on the type of correspondence, information will be necessary to ensure that the dematerialization of the correspondence and the archiving take place.

It is in the list of types of correspondence and in the CCU that all the information is found that is prescribed by the OPETs and by the PSC-COR. In one embodiment of the invention, these verifications consist in:

checking in the FD (structured file) that there is no omission of information (syntax): designation of the model service in the list of the TYPCOs (20 types of correspondence in a preferred embodiment) receiving certification of probative value; reference of each correspondence file (text) and note specifying the recipient, optionally with his address;

checking in the FC of each item of correspondence that certain essential information has indeed been indicated by the sender in his handover.

At the output of his step, the server of the PSD operator produces a TOCC which contains, for all the FIOs handed over, the various verified data that will be necessary for the sequencing of the operations of secure electronic correspondence.

$3^{rd}$ sub-step of the $3^{rd}$ step of a session of type $S_1$:validation JN.

This involves outputting a JN for validation of the TOCC for the items of correspondence that have been checked positively. The negative checks will subsequently be the subject of a notification to the sender on the occasion of the acknowledgement or of the acknowledgement of receipt that he receives in the end from the BPG that has processed his correspondence request. A validation JN takes the form, for example, of the table of FIG. 10c. The table is completed for each correspondence type (TYPCO). The validation JN is used to list the correspondence sender/recipient pairs that comply with the specifications provided for each TYPCO or model service (PM). Each TYPCO is defined as a model service (PM) based on a simple file or on a structured data file (FDS) of which the essential information is known to the parties in correspondence in the system of the invention (information defined in an appendix to the COB). Depending on the PMs, the PSC-COR determines the tokens and the tables that must be transferred to the PSD and to the OPETs. If the routing or addressing information is unknown to the BPG of the sender, it will be completed by the PSC-COR when the recipients and/or OPETs are registered in its network.

At the output of this $3^{rd}$ step of a session of type $S_1$, which is carried out by the BPG server, the PSC-COR of the sender takes over.

During a $4^{th}$ step of a session of type $S_1$, the PSC-COR verifies that the routing or trust path information for each recipient is true and completes the portion of the missing information that it holds (notably RID of the recipients and OPETs that are attached thereto with valid contracts). The PSC-COR will also validate the scores of the digital identities of the recipients in order to confirm that currently, for each correspondence pair, the total of the two scores (sender and recipient) is sufficient for the type of correspondence requested.

The PSC-COR also validates the powers and other trust attributes along the trust system leading to each recipient.

These validations of the $4^{th}$ step of a session of type $S_1$ take place on a table that can take the form of the example illustrated in FIG. 10d. This TOCC is communicated by the BPG server to the PSC-COR of the sender at the end of the preceding step. This table is completed, and if necessary corrected, by the said PSC-COR. The latter holds a national directory of the RIDs knowing for each holder of a CCC his digital identity score (which is dynamic since it can change under certain conditions after registration or depending on the level of traffic generated over the year).

The PSC-COR also "synchronizes" for each sender/recipient pair the requests made to their PSCE-SEs (if they use an electronic signature) and to those that have registered the electronic signatures of the OPETs which will necessarily use electronic signatures on the services that are entrusted to them. The PSC-COR regularly verifies that the electronic signatures that are involved in the dematerialization process established for the type of correspondence to be used for each sender/recipient pair are indeed valid. These signatures are those used by the PSC-COR for signing each session and the delivery of tokens, those used by the sending BPGs for the transmittal report, and recipient BPGs for the reception report, those used by the sending OPETs for the sealing, archiving and optionally the secure transfer of the document, and recipient OPETs for the sealing, archiving and optionally the secure transfer of the AR.

The PSC-COR also synchronizes the session with a PSCE-HD in order to establish a time stamp on the beginning of the session that it has validated.

The PSC-COR of the sender then verifies the affiliation numbers of each OPET involved in the provision of dematerialization services in order to perform the tasks of composition, of ampliation, of archiving, of switching, and of transmission both for the correspondence document and for that of the acknowledgement of receipt.

Thus, the PSC-COR verifies that all the sealing mandates and forms of proxy are indeed in force when the OPETs receive the instructions from the BPGs on behalf of their adherents, on the one hand the sender, and on the other hand the recipients. This verification is made as indicated above as detailed in FIG. 2. In one embodiment of the invention, all the verifications made hitherto in this step produce a bilateral correspondence enrolment table (TECB).

Finally, the PSC-COR of the sender verifies that it knows all the IP addresses of the communication servers incorporated into the dematerialization functions of the OPETs, of the directories, of the PSDs and of the other PSC-CORs. Specifically, in order to automate the data interchanges that accompany each type of correspondence in its execution, it is necessary to verify in advance that all the necessary IP addresses are held. In one embodiment of the invention, this verification produces an interservices connectivity matrix (MCIS).

The generation of a validation log gives form to the verifications made during this $4^{th}$ step of a session of type $S_1$. This log lists the correspondence pairs indicated with their correspondence number while indicating each time the formal conformity and the possible anomalies, which may or may not be blocking, for the launching of the processing operation by the BPG server of the sender. An example of a log of this type is shown in FIG. 10e, which takes the same format as that of the validation JN in FIG. 10d established by the BPG server at the end of the $3^{rd}$ sub-step of the $3^{rd}$ step of a session of type $S_1$. The information that appears in this validation log relates to the validation stamp by the PSC-COR.

During a $5^{th}$ step of a session of type $S_1$, the PSC-COR establishes a documentary probative value matrix (MVPD).

The said PSC-COR creates, for each line of correspondence for which the stakeholders have trust attributes that are exhaustive and conform to the regulation (as verified at the end of the $4^{th}$ step) and for each type of bilateral correspondence, the tokens J defined in FIGS. 2 and 3 that are necessary for administering the dematerialization proofs for the current TYPCO.

The MVPD makes it possible to meet the legal obligations of probative value for the dematerialized correspondence when it is furnished by the PSC-COR with the tokens necessary for the operations of the dematerialization system that are specific to each type of correspondence. This method of administrating the proof is secure because the tokens J pass, on the outbound journey and on the return journey, through a communication network between PSC-COR, directories, PSD and OPET by using the secure communication protocol described below.

These tokens, assigned to each line of correspondence and depending on the correspondence model chosen by the sender (TYPCO), are transmitted to the BPG of the sender. They will be addressed at the time of the sequencing of the operations for processing the electronic correspondence to the OPET(s) concerned for execution.

If, as is often the case, the OPET(s) of the recipient is (are) involved in composing, archiving and switching management coupons (secondary documents attached to the main document of the electronic correspondence), such as an AR, the PSC-COR divides its documentary probative value matrix MVPD into two and hence its tokens of probative value:
 one matrix dedicated to the BPG server of the sender: n tokens
 one matrix dedicated to the BPG server of the recipient: p tokens.

There are also two additional and collective tokens (a collective token is a token that is not attached to a document but to a series of stored documents being validated on the side of the sender first and on the side of the recipient thereafter), one of them created by a session of type $S_2$ for the PVE (transmittal report) and the other by a session of type $S_3$ for the PVR (receipt report).

During a $6^{th}$ step of a session of type $S_1$, the PSC-COR addresses to the PSD server of the sender (in his BPG), for each correspondence pair, and for each type of correspondence, a line authorizing the sequencing of the processing operations. This line comprises each token to be handed over to each OPET involved in the dematerialization process. All the information relating to the signatures, the domiciliations, the mandates and forms of proxy, the scores of the sender/recipient pair are indicated. If an item is missing, this omission is notified to the BPG of the sender.

If the PSD, the OPET or the PSC-COR of the recipient are contributors notably for dematerializing the acknowledgement of receipt of a correspondence number, the PSC-COR also addresses a line authorizing the sequencing by the PSD of the recipient to the OPETs of the recipient. This line comprises each token to be handed over to each operator involved in the dematerialization process.

In a preferred embodiment of the invention, depending on the complexity of each type of correspondence, there are, for each instance of bilateral correspondence, between 5 and 15 tokens which may be created by the PSC-COR of the sender and sent to the PSD EXP operator or to both the PSD EXP and PSD DES operators. These tokens are conveyed by the PSD servers to the OPETs which act on behalf of their respective adherents in the electronic correspondence operation that is the subject of the session. The OPETs must return the said tokens to the said PSD servers with the reference of the logging line of the operations that they have carried out.

The tables/matrices that summarize the features of all the items of correspondence are sent by the PSC-COR (TECB+ MVPD) to the PSD server of the sender. These tables/matrices comprise the characteristics of the service providers designated by the sender and by each of the recipients. These characteristics consist essentially in indicating the mandates, the forms of proxy of sealing, the validities of the activated signatures, the IP addresses of the servers, and the corresponding tokens for the OPETs for each of their specific operations. The PSC-COR of the sender sends the tokens in several matrices of secure correspondence, one to the PSD server of the sender, and the others to the PSD servers of the recipients which are responsible notably for the dematerialization of the acknowledgement of receipt AR coupons.

Each PSD, whether it pertains to the sender or a recipient, therefore receives its matrix of correspondence tokens even before the sequencing is begun by the PSD server of the sender on the OPET designated for one or more correspondence envelopes.

The matrix of documentary probative value MVPD always depends on the complexity of the type of correspondence to be carried out. The tokens are then conveyed in the sequencing between each PSD server/sequencing function and the operator, and for each OPET, between its various dematerialization functions. There is one token for each type of operation: composition, archiving, switching, multi-channel transmission, secure transfer.

On receipt of the MVPD, each PSD server returns an acknowledgement to the sender/recipient user in order to indicate to him, for each pair and correspondence number, the mail items that are accepted, and those that are rejected for the reasons or the anomalies indicated.

The transmissions of tokens by the OPETs will be initiated after sequencing of the electronic correspondence operation that is the subject of the current session of type $S_1$ during sessions which, depending on the TYPCO, must necessarily follow a session of type $S_1$. The OPETs responsible for this transmission are indicated in FIG. 10f:

In thin text (J1 to J5; J6; J8 to J10; J12): initiated by a session of type $S_2$ (a session for sending a transmittal PV) by one of the OPETs of the sender (OPET1);

In bold (J13 to J15; J15 to J18): initiated by a session of type $S_3$ (a session for sending a reception PV) by one of the OPETs of each recipient (OPET2).

An additional complexity parameter comes from the fact that the services of the OPETs may be either remote in the country of residence of the sender or of the recipients, or centralized in a shared services centre (SSC): the OPEN (national) is then distinguished from the OPEM (mutualized) or SSC. For each type of correspondence service, the operations will automatically be attributed between the OPENs and the OPEMs with their reference PSD and PSC-COR servers.

After the $6^{th}$ step of a session of type $S_1$, during a $7^{th}$ step, the PSD server of the sender notifies the user/sender of the availability of the N items of correspondence validated by the PSC-COR so that it can, itself or through its agent, validate the sending of the said items of correspondence.

FIG. 11 shows the data flows managed by a session of type $S_2$ in one embodiment of the invention.

When it has received the notification of availability for sending from its PSD server, the sender must initiate a session of type $S_2$, by beginning by authenticating via a session of type $S_0$, substantially identical to that described above (by indicating that it wishes to open a session of type $S_2$, which will limit the checks made to those required by an authorization for a session of this type—authorization $H_2$).

A session of type $S_2$ carried to its term constitutes an instruction to send, by the PSD server of the sender, envelopes of correspondence that have been validated during a previous session of type $S_1$. A PVE token is created at the beginning of this session.

During a $1^{st}$ step of the session of type $S_2$, the sender then chooses the execution of the instructions for the sending of the correspondence that it sends to the OPET1 with the tokens created in $S_1$.

During a $2^{nd}$ step of the session of type $S_2$, the sending instruction triggers a switch out (SWO) transfer operation from the PSD server to OPET1: N envelopes authorized for transmission with transfer of the corresponding tokens. During a $3^{rd}$ step of the session of type $S_2$, this instruction, once executed, triggers an ACK with logging of the return of the PVE token of the session of type $S_2$. The tokens then follow the trust system by SWO transfer from the OPET of the sender responsible for composition (OPET COMP) to the OPET of the sender responsible for the ampliation (OPET-AMP), this transfer being immediate and consisting of N validated envelopes, with their tokens, according to the TYPCO model of each correspondence.

During a $4^{th}$ step of the session of type $S_2$, the OPET1 at the end of the system, normally the one responsible for transmission, sends an ACK, logs the execution of the instruction and returns the token for a session of type $S_2$ to the PSD1 server which returns it to the PSC-COR1.

During a $5^{th}$ step of the session of type $S_2$, the OPET1s of the sender carry out the processing operations that are allocated to them on the correspondence validated by the sender, notably an ampliation. After execution of the processing operations that are allocated to it, each OPET1 carries out an SWO transfer of the correspondence versions that they have processed and of the corresponding tokens, the said transfer being immediate or deferred (TYPCO model). These transfers, after execution, trigger ACKs with logging of the execution of the processing operations and a return of the execution tokens corresponding to each operation to the PSC-COR which returns them to the PSD server.

During this $5^{th}$ step, the ARs for the TYPCOs that require them are also created. This creation, subordinate to the holding of the corresponding token, is carried out by the OPET responsible for the composition (OPET-COMP2 on the side of each recipient). The corresponding token is sent to the PSD2 servers of all the recipients. Each recipient declared in the system as being able to receive electronic correspondence receives a notification from its PSD2 server by e-mail.

After execution of this last step of a session of type $S_2$, the PSD1 and PSC-COR1 servers are normally in possession (unless there is an anomaly in the processing system) of the sender tokens. Depending on the TYPCO, it is now the task of the PSC-COR1 to receive the tokens validating the receipt by the recipients in order to be able to deliver these certificates of probative value. It is the purpose of the sessions of type $S_3$ that will now be described.

FIG. 12 represents the data flows managed by a session of type $S_3$ in one embodiment of the invention.

A recipient of an item of correspondence sent by the system of the invention, which, by virtue of the checks made before sending, has been recognized as being capable of receiving the said items of correspondence electronically, receives from its PSD2 server a notification of availability of the items of correspondence that are intended for it. If, on the other hand, the checks have shown that it was not capable of receiving the said items of correspondence electronically, it will receive them by post or by fax (if its appropriate domiciliation data appeared in the directory of the sender).

In the $1^{st}$ case (electronic correspondence handed over), it is necessary to distinguish, depending on the TYPCO, whether an AR is necessary. If that is not the case, the recipient can merely read the correspondence received on his BPG2 using a session of type $S_4$, which will be described briefly later on in the description.

In the $2^{nd}$ case, the recipient must initiate a session of type $S_3$ beginning by authenticating himself through a session of type $S_0$, substantially identical to that described above (except that he declares that he wishes to carry out a session of type $S_3$ and that only the checks required by an authorization for a session of this type will be executed—authorization $H_3$).

The session receives an instance number from the BPG of the recipient and a session number from its PSC-COR. The recipient may choose in his BPG the items of correspondence for which he wishes to acknowledge reception by activating the tokens that are pending in order to subordinate to his validation the creation of the specific ARs handed to his OPET-COMP. A transmittal PV token is created for all the items of correspondence for which he wishes to sign the AR. The transmittal instruction for each AR is transferred (SWO) by the BPG2 to the competent OPET2s which carry out the operations of processing these ARs. After this is done, an ACK and an execution log are produced with return of the token for a session $S_3$.

The sessions of types $S_4$, $S_5$ and $S_6$ are less complex than the foregoing. They will therefore not be described in detail.

A session of type $S_4$ is designed to allow the consultation of the electronic correspondence transmitted and received by a user on his BPG. As for all the other types of session, a session of type $S_4$ must be initiated by a session of type $S_0$, but the necessary authorization ($H_4$) is much less onerous than for a session of type $S_1$.

A session of type $S_5$ is designed to allow a user to hand over to his BPG electronic documents that he wishes to archive. As a general rule, one token for each archive deposit is associated with this session. The preferred archiving modalities in the context of the application of the system of the invention are described in two patents filed on 29 Mar. 2009 by the applicant of the present application (no. of filing with the INPI: FR09/1441 and FR09/1442). The archiving operation involves an OPET, normally specializing in this type of operation, which will sign the filing with its electronic signature. The archiving can be carried out in encrypted mode. The validation of the handover presupposes the checking of all the information relating to the archiving OPET, as for all the other OPETs, notably its authorization, the validity of its electronic signature, its IP address and the powers of its agents.

Once the handover of the documents to be archived is validated, a session of type $S_6$ is opened, in the same conditions as for the other types of session, so that the user can sign the archiving of the validated documents. This session normally gives rise to the creation of a single token for the session.

The system of the invention may be applied by providing commercial servers, the performance of which must be designed according to the flows to be processed by the system. It is also the case for the devices for on-line storage and for off-line archiving. It is necessary to provide the redundancies that make it possible to fulfill the obligations of quality of service provided in the conventions with the users. The computer processing centres hosting these servers and storage devices must be furnished with security devices and procedures that comply with the prior art which make it possible to guarantee their integrity against physical or cyber attacks.

The physical architecture of the communication network that links the various servers and storage devices must satisfy the same imperatives, but may be designed, deployed and operated by a person skilled in the art. It must be defined to optimize the data flows and storages, which may lead to having several servers for each level of functional architecture described in FIG. 1. The logical architecture of the network connecting the servers hosting the directories, the servers of the PSDs, of the OPETs and of the PSC-CORs must however meet, for a preferred application of the system of the invention, specifications that have been mentioned on several occasions and that are explained in detail in the following paragraphs.

The communication protocol used in the system of the invention is prescribed principally by specifications established by one or more PSC-CORs. The main elements of specifications conforming to the prescriptions of the present invention include the following features:

each server hosting a directory, the functions of a PSD, the functions of an OPET and the functions of a PSC-COR has a communication module having a unique identifier attached to its IP address, optionally supplemented by a password controlling the inputs and the outputs;

the links between the servers are established by the MCIS designating the authorized bijective relationships and optionally specifying the univalent or one-to-one mapping transmission;

the PSC-COR must be able to receive a signed acknowledgement of receipt for any secure communication that it establishes with all the servers hosting directories, functions of a PSD and functions of the OPETs; accordingly, each communication is subjected to an electronic signature using a symmetrical key pair and requiring counterparts of the communication, an AR or ACK (acknowledgement); the AR may be subjected to a detailed confirmation proving that the file has been opened, checked in terms of integrity, and checked in terms of conformity (verification in the transported structured file that the essential information does in fact exist on arrival);

so long as the confirmation of receipt is not received, the sender of the file is not allowed to destroy it.

Furthermore, in the communication network provided for applying the system of the invention, sub-networks are defined which determine the modalities for routing the items of correspondence, the tokens and the validation tables between the various servers involved in the secure electronic correspondence operations and the modalities of validation of the said routing in the sessions opened in order to carry out a handover, a transmittal or a receipt of secure electronic correspondence. The appropriate sub-network is defined for each correspondence session. In a preferred embodiment of the invention, 4 sub-networks are defined that are identified as $R_1$ to $R_4$:

$R_1$: the sender and all the recipients are attached to one and the same PSD, use one and the same OPET and the same PSC-COR;

$R_2$: there are at least two different PSDs that must be involved in the secure electronic correspondence operation; the OPETs and PSC-CORs are common;

$R_3$: there are at least two different PSDs which must be involved in the secure electronic correspondence operation; there are at least two OPETs; the PSC-COR is common;

$R_4$: there are at least two different PSDs which must be involved in the secure electronic correspondence operation; there are at least two OPETs; there are at least two PSC-CORs.

In the sub-network $R_1$, a single server hosting a directory has all the information relating to the parties to the secure electronic correspondence operation. In the sub-networks $R_2$ and $R_3$, at least two servers hosting directories are necessary for holding this information, these servers hosting directories being interrogated by the common PSC-COR. In the case of the sub-network $R_4$, a protocol for the centralization of the servers hosting directories must have been defined between the PSC-CORs concerned. One of the modalities is to provide a "super" PSC-COR having this competence for several countries.

The examples described above are given as an illustration of the embodiments of the invention. They in no way limit the scope of the invention which is defined by the following claims.

The invention claimed is:

1. A system for managing sessions of secure electronic correspondence between at least one sending user and at least one receiving user, the system comprising:
at least one directory server;
at least one electronic correspondence domiciliation server comprising a private management office for each user, for at least choosing at least one correspondence counterpart, and validating a content of a correspondence to be sent and storing the correspondence once sent;
at least one server for processing the correspondence; at least one electronic correspondence certification server;
wherein the at least one domiciliation server further comprises:
at least one electronic correspondence sessions management module comprising at least one authorization submodule for the opening of a session between a user and his private management office on condition of verifying by request, before said opening, to at least one certification server that the user, the user's counterpart and the electronic correspondence processing servers all have identity attributes stored in a database that match or exceed preset confidence, and
wherein the at least one authorization submodule is configured to authorize the opening of the session to execute an authentication function of a user of the system by verifying a matching of a code entered by the user into the domiciliation server with a single secret transmitted in two different forms by the certification server, on one hand to the domiciliation server and on the other hand to the user, this second transmission being over a communication channel which is different from that by which the user connects to the system, the output of the authentication function being a condition of a continuation of the opening of the session.

2. The system for managing sessions of secure electronic correspondence according to claim 1, wherein the authentication function transmits the secret to the domiciliation server in the form of an item of information computed from the secret generated by the certification server and of at least one data item which characterizes the session being opened, the data item being created by the domiciliation server and transmitted to the certification server.

3. The system for managing sessions of secure electronic correspondence according to claim 2, wherein the information is an enrolment number attached to the session and computed as a product of the secret and of a sequence number of the session being opened.

4. The system for managing sessions of secure electronic correspondence according to claim 1, wherein the sending user can invite at least one receiving user to register on a domiciliation server proposed in a list comprising at least one element.

5. The system for managing sessions of secure electronic correspondence according to claim 4, further comprising an invited-users registration module, the module offering the invited user an option of supplying at least information relating to his identification and physical and electronic address attributes comprising at least one mobile telephone number.

6. The system for managing sessions of secure electronic correspondence according to claim 5, wherein the registration module further offers the user an option of adhering to a universal correspondence convention proposed by the selected domiciliation server and to a bilateral correspondence convention proposed by the inviting user.

7. The system for managing sessions of secure electronic correspondence according to claim 5, wherein the registration module further proposes to the registering user the supply of material proofs of at least one portion of the identification and address information that he has supplied to the module and accepts his registration only after reception and checking that the proofs conform to the information supplied to the module.

8. The system for managing sessions of secure electronic correspondence according to claim 1, wherein the certification server comprises a database of non-repudiated electronic signatures of the users, of the domiciliation operators, of the processing operators and of the certification operators, the database being updated with the service providers sending the signatures at a frequency computed as a function of a statistic of repudiation of the signatures and of a statistic of electronic correspondence flow.

9. The system for managing sessions of secure electronic correspondence according to claim 1, wherein the sessions management module further comprises a submodule for managing handovers of correspondence to be sent to the private management office of a user.

10. The system for managing sessions of secure electronic correspondence according to claim 9, wherein the submodule for managing handovers is capable of refusing a handover of correspondence if a scoring criterion of the sender/receiver pair of the correspondence is below a scoring threshold prescribed by the certification operator.

11. The system for managing sessions of secure electronic correspondence according to claim 9, wherein the submodule for managing handovers comprises a function of creating a consolidated correspondence sequence table containing, for each recipient, their validated address data, references of the validated files to be sent, and the sequence numbers of each line of correspondence.

12. The system for managing sessions of secure electronic correspondence according to claim 11, wherein the submodule for managing handovers comprises, at the output of the function for creating a consolidated correspondence sequence table, a function for outputting a date-stamped log of validation of the creation.

13. The system for managing sessions of secure electronic correspondence according to claim 11, wherein the submodule for managing handovers comprises, at the output of the function for creating a consolidated correspondence sequence table, a function for sending a message to the certification server, said message comprising the consolidated correspondence sequence table, then a function for receiving a message from the certification server, the message comprising a consolidated correspondence sequence table corrected and validated by the certification server.

14. The system for managing sessions of secure electronic correspondence according to claim 9, wherein the submodule for managing handovers comprises a function for managing tokens for certifying the execution of processing operations to be carried out on each item of electronic correspondence.

15. The system for managing sessions of secure electronic correspondence according to claim 14, wherein the function for managing certification tokens is capable of receiving the tokens from the certification server, in a matrix at the domiciliation server, the matrix comprising all the tokens necessary for the certification of the items of correspondence sent or received during the current session by the certification operator.

16. The system for managing sessions of secure electronic correspondence according to claim 15, wherein the function for managing certification tokens is capable of routing the received tokens to the processing operators.

17. The system for managing sessions of secure electronic correspondence according to claim 16, wherein the function for managing certification tokens is capable of receiving from the certification server a message comprising the certification tokens of the processing operations that have been carried out in conformity with the specifications of the certification operator.

18. The system for managing sessions of secure electronic correspondence according to claim 1, wherein the sessions management module further comprises a submodule for validation, by the user or an agent designated by him, of the sending of the electronic correspondence to his recipients.

19. The system for managing sessions of secure electronic correspondence according to claim 18, wherein the validation submodule comprises a function for outputting a validation log indicating the completeness of the checks carried out before validation.

20. The system for managing sessions of secure electronic correspondence according to claim 18, wherein the validation submodule comprises a function for outputting a table of validation of the trust attributes of each receiving user.

21. The system for managing sessions of secure electronic correspondence according to claim 18, wherein the validation submodule comprises a function for sealing the electronic correspondence.

22. The system for managing sessions of secure electronic correspondence according to claim 1, wherein the sessions management module further comprises a submodule for managing acknowledgements of receipt of the electronic correspondence.

23. The system for managing sessions of secure electronic correspondence according to claim 1, wherein the sessions management module further comprises a submodule for managing communications between users of the system, the module being capable of making a choice of secure routing path based on information relating to the domiciliation server and to the certification server of which the sending users, the receiving users, the operators for processing the electronic correspondence and the certification operators are subscribers.

24. The system for managing sessions of secure electronic correspondence according to claim 23, wherein the submodule for managing communications between users of the system is capable of producing a choice between
   a first type of routing paths when a sender and a receiver use a single domiciliation operator, a single processing operator and a single certification operator,
   a second type of routing paths when a sender and a receiver use at least two domiciliation servers, a single processing operator and a single certification operator,
   a third type of routing paths when a sender and a receiver use at least two different domiciliation servers, at least two processing operators and a single certification operator, and
   a fourth type of routing paths for different certification servers when a sender and a receiver use at least two different domiciliation servers, at least two processing operators and at least two certification operators.

25. A method for managing sessions of secure electronic correspondence between at least one sending user and at least one receiving user the method comprising:
   a step of connection to at least one directory server;
   at least one step of connection to an electronic correspondence domiciliation server the server comprising a private management office for each user, for at least choosing at least one correspondence counterpart, and validating a content of a correspondence to be sent and storing the correspondence once sent;
   at least one step of processing the items of correspondence; and
   at least one step of connection of the domiciliation server to the electronic correspondence certification server; wherein the step of connection to the domiciliation server also comprises at least one step of managing electronic correspondence sessions comprising at least one sub-step of authorizing the opening of a session between a user and his private management office on condition of verifying by request, before said opening, to at least one certification server that the user, the user's counterpart and the operators of the steps of processing the electronic correspondence all have identity attributes stored in a database that match or exceed preset confidence levels,
   wherein the at least one sub-step of authorizing the opening of the session executes an authentication function of a user of the system by verifying a matching of a code entered by the user into the domiciliation server with a single secret transmitted in two different forms by the certification server, on one hand to the domiciliation server and on the other hand to the user, this second transmission being over a communication channel which is different from that by which the user connects to the system, the output of the authentication function being a condition of a continuation of the opening of the session.

26. The method for managing sessions of secure electronic correspondence according to claim 25, wherein the step of managing sessions of electronic correspondence further comprises a sub-step of managing handovers of correspondence to be sent to the private management office of a user.

27. The method for managing sessions of secure electronic correspondence according to claim 25, wherein the step of managing sessions of electronic correspondence further comprises a sub-step of validation, by the user or an agent designated by him, of the sending of the electronic correspondence to his recipients.

28. The method for managing sessions of secure electronic correspondence according to claim 25, wherein the step of managing sessions of electronic correspondence further comprises a sub-step of managing communications between users of the system, the sub-step being capable of making a choice of secure routing path based on information relating to the domiciliation server and to the certification server of which the sending users, the receiving users, the operators for processing the electronic correspondence and the certification operators are subscribers.

* * * * *